United States Patent
Xu et al.

(10) Patent No.: US 11,039,349 B2
(45) Date of Patent: Jun. 15, 2021

(54) METHOD AND APPARATUS FOR ENHANCING PROCEDURE FOR LTE/NR INTERWORKING IN WIRELESS COMMUNICATION SYSTEM

(71) Applicant: LG ELECTRONICS INC., Seoul (KR)

(72) Inventors: Jian Xu, Seoul (KR); Daewook Byun, Seoul (KR); Seokjung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/064,884

(22) PCT Filed: Mar. 23, 2018

(86) PCT No.: PCT/KR2018/003424
§ 371 (c)(1),
(2) Date: Sep. 20, 2019

(87) PCT Pub. No.: WO2018/182240
PCT Pub. Date: Oct. 4, 2018

(65) Prior Publication Data
US 2020/0389823 A1    Dec. 10, 2020

Related U.S. Application Data

(60) Provisional application No. 62/519,835, filed on Jun. 14, 2017, provisional application No. 62/500,559, (Continued)

(51) Int. Cl.
*H04W 36/00*    (2009.01)

(52) U.S. Cl.
CPC ... *H04W 36/0069* (2018.08); *H04W 36/0061* (2013.01)

(58) Field of Classification Search
CPC ..................................................... H04W 36/00
See application file for complete search history.

(56) References Cited

U.S. PATENT DOCUMENTS

| | | | |
|---|---|---|---|
| 9,699,702 B2* | 7/2017 | Fujishiro | H04W 36/06 |
| 2016/0212790 A1 | 7/2016 | Fujishiro et al. | |
| 2018/0014353 A1* | 1/2018 | Pao | H04W 76/15 |

FOREIGN PATENT DOCUMENTS

| KR | 101365588 B1 | 2/2014 |
|---|---|---|
| KR | 1020150096499 A | 8/2015 |

(Continued)

OTHER PUBLICATIONS

Ericsson, "RRM and related control plane aspects for LTE-NR tight-interworking", 3GPP TSG-RAN WG2 NR Ad Hoc, Jan. 17-19, 2017, R2-1700486.

(Continued)

*Primary Examiner* — Michael T Vu
(74) *Attorney, Agent, or Firm* — Dentons US LLP

(57) ABSTRACT

Provided are a method and an apparatus for performing a secondary node change procedure disclosed by a source secondary node in a wireless communication system. A master node receives a secondary node change request message from the source secondary node, transmits a secondary node addition request message to a target secondary node, receives a secondary node addition request confirm message from the target secondary node, and transmits a secondary node change request confirm message to the source secondary node.

8 Claims, 19 Drawing Sheets

Related U.S. Application Data filed on May 3, 2017, provisional application No. 62/491,304, filed on Apr. 28, 2017, provisional application No. 62/476,730, filed on Mar. 25, 2017.

(56) References Cited

FOREIGN PATENT DOCUMENTS

| | | |
|---|---|---|
| KR | 1020160132071 A | 11/2016 |
| WO | 2016114612 A1 | 7/2016 |
| WO | 2018983236 A1 | 5/2018 |

OTHER PUBLICATIONS

Huawei, HiSilicon, "Management of SgNB change", 3GPP TSG-RAN WG2 #97, Feb. 13-17, 2017, R2-1701845.
Nokia, Alcatel-Lucent Shanghai Bell, "Introduction of LTE-NR Tight Interworking functionality" 3GPP TSG-RAN WG3 Meeting #95bis, Apr. 3-7, 2017, R3-170999 (Change Request).

* cited by examiner

METHOD AND APPARATUS FOR ENHANCING PROCEDURE FOR LTE/NR INTERWORKING IN WIRELESS COMMUNICATION SYSTEM

CROSS-REFERENCE TO RELATED APPLICATIONS

This application is the National Stage filing under 35 U.S.C. 371 of International Application No. PCT/KR2018/003424 filed on Mar. 23, 2018, which claims the benefit of U.S. Provisional Applications No. 62/476,730 filed on Mar. 25, 2017, No. 62/491,304 filed on Apr. 28, 2017, No. 62/500,559 filed on May 3, 2017 and No. 62/519,835 filed on Jun. 14, 2017, the contents of which are all hereby incorporated by reference herein in their entirety.

TECHNICAL FIELD

The present disclosure relates to wireless communication and, more particularly, to a method and apparatus for improving a procedure for interworking of $3^{rd}$ generation partnership project (3GPP) long-term evolution (LTE) and new radio access technology (NR) among wireless communication systems.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. The NR system may be called another name, e.g. new radio access technology (new RAT). 3GPP has to identify and develop the technology components needed for successfully standardizing the NR timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

According to new architecture for the 5G core network and 5G radio access network (RAN) including NR, a user equipment (UE) may receive a better service in view of throughput and UE experience. Also, tight interworking of LTE/NR is under discussion. Due to tight interworking of LTE/NR, interworking between an eNodeB (eNB) and a new RAN node (for example, gNB) is allowed, and as a result, throughput of a UE may be improved. An eNB of the LTE and gNB of the NR may manage resources individually. More specifically, dual/multiple connections for improving throughput of a UE according to the tight interworking of LTE/NR may be used, and signaling for UE mobility may be simplified.

In NR, to provide a better service to a UE, signaling may be improved by offloading a bearer to a secondary node. Also, the mobility procedure may be optimized. A method for optimizing the offloading procedure may be needed for an RAN node which performs tight interworking of LTE/NR.

SUMMARY

The present disclosure provides a method and apparatus for improving a procedure for interworking of $3^{rd}$ generation partnership project (3GPP) long-term evolution (LTE) and new radio access technology (NR) among wireless communication systems. The present disclosure provides a method and apparatus for changing a secondary node when the LTE and NR are connected through dual connectivity.

In an aspect, a method for performing a secondary node change procedure, which is initiated by a source secondary node, by a master node in a wireless communication system is provided. The method includes receiving, by the master node from the source secondary node, a secondary node change request message, transmitting, by the master node to a target secondary node, a secondary node addition request message, receiving, by the master node from the target secondary node, a secondary node addition request acknowledge message, and transmitting, by the master node to the source secondary node, a secondary node change request acknowledge message.

In another aspect, a master node in a wireless communication system is provided.

The mater node includes a memory, a transceiver, and a processor, operably coupled to the memory and the transceiver. The processor controls the transceiver to receive, from a source secondary node, a secondary node change request message, controls the transceiver to transmit, to a target secondary node, a secondary node addition request message, controls the transceiver to receive, from the target secondary node, a secondary node addition request acknowledge message, and controls the transceiver to transmit, to the source secondary node, a secondary node change request acknowledge message.

The secondary node may directly start the secondary node change procedure.

DETAILED DESCRIPTION

Hereinafter, in the present disclosure, a wireless communication system based on a 3rd generation partnership project (3GPP) or institute of electrical and electronics engineers (IEEE) is mainly described. However, the present disclosure is not limited thereto, and the present disclosure may be applied to other wireless communication systems having the same characteristics to be described hereinafter.

Figure 1:
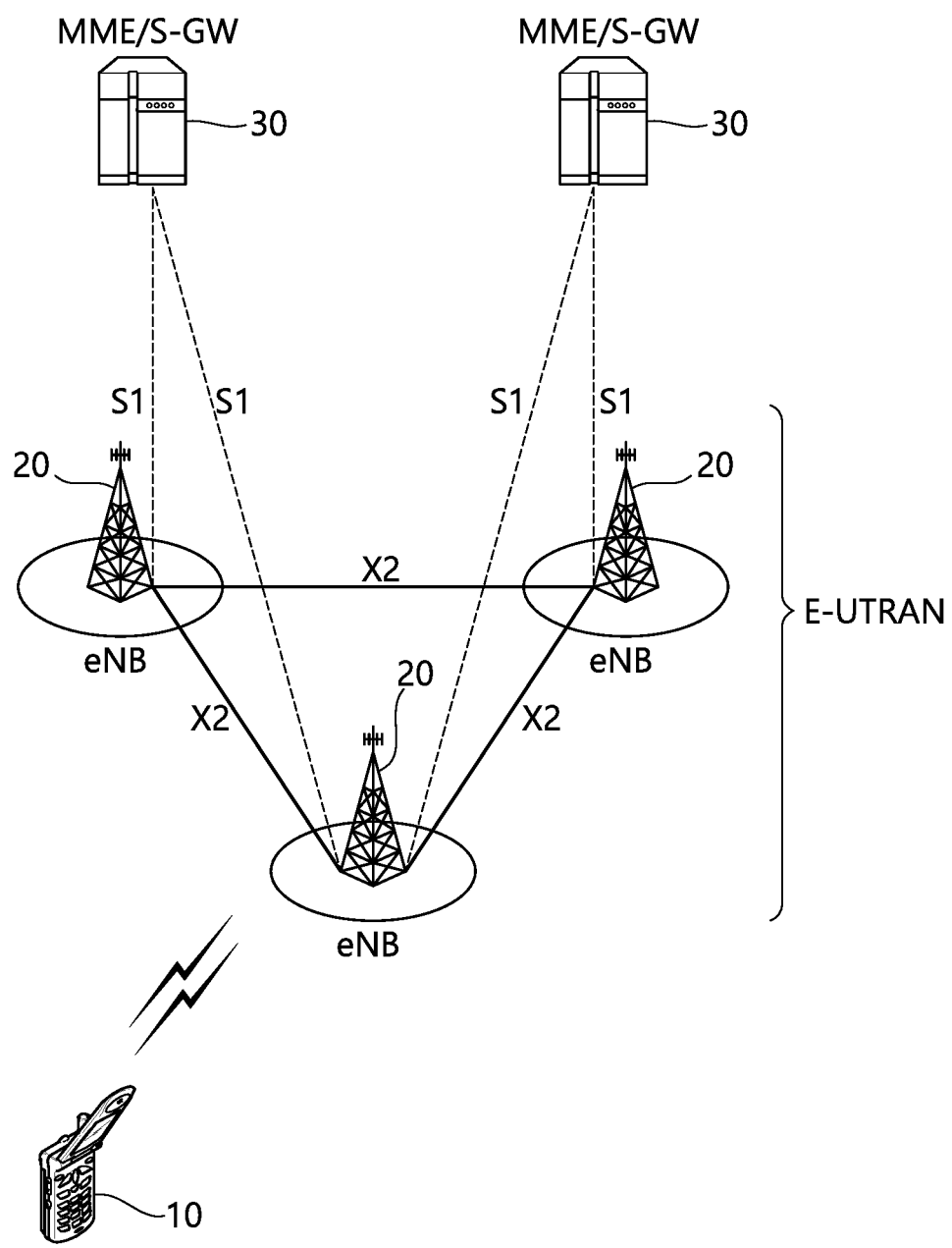
FIG. 1 shows 3GPP LTE system architecture.

FIG. 1 shows 3GPP LTE system architecture. Referring to FIG. 1, the 3GPP long-term evolution (LTE) system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. The eNB 20 is connected to the gateway 30 via an S1 interface.

5G system is a 3GPP system consisting of 5G access network (AN), 5G core network (CN) and UE. 5G access network is an access network comprising a next generation radio access network (NG-RAN) and/or non-3GPP access network connecting to a 5G core network. NG-RAN is a radio access network that supports one or more of the following options with the common characteristics that it connects to 5G core network:

1) Standalone new radio (NR).
2) NR is the anchor with E-UTRA extensions.
3) Standalone E-UTRA.
4) E-UTRA is the anchor with NR extensions.

Figure 2:
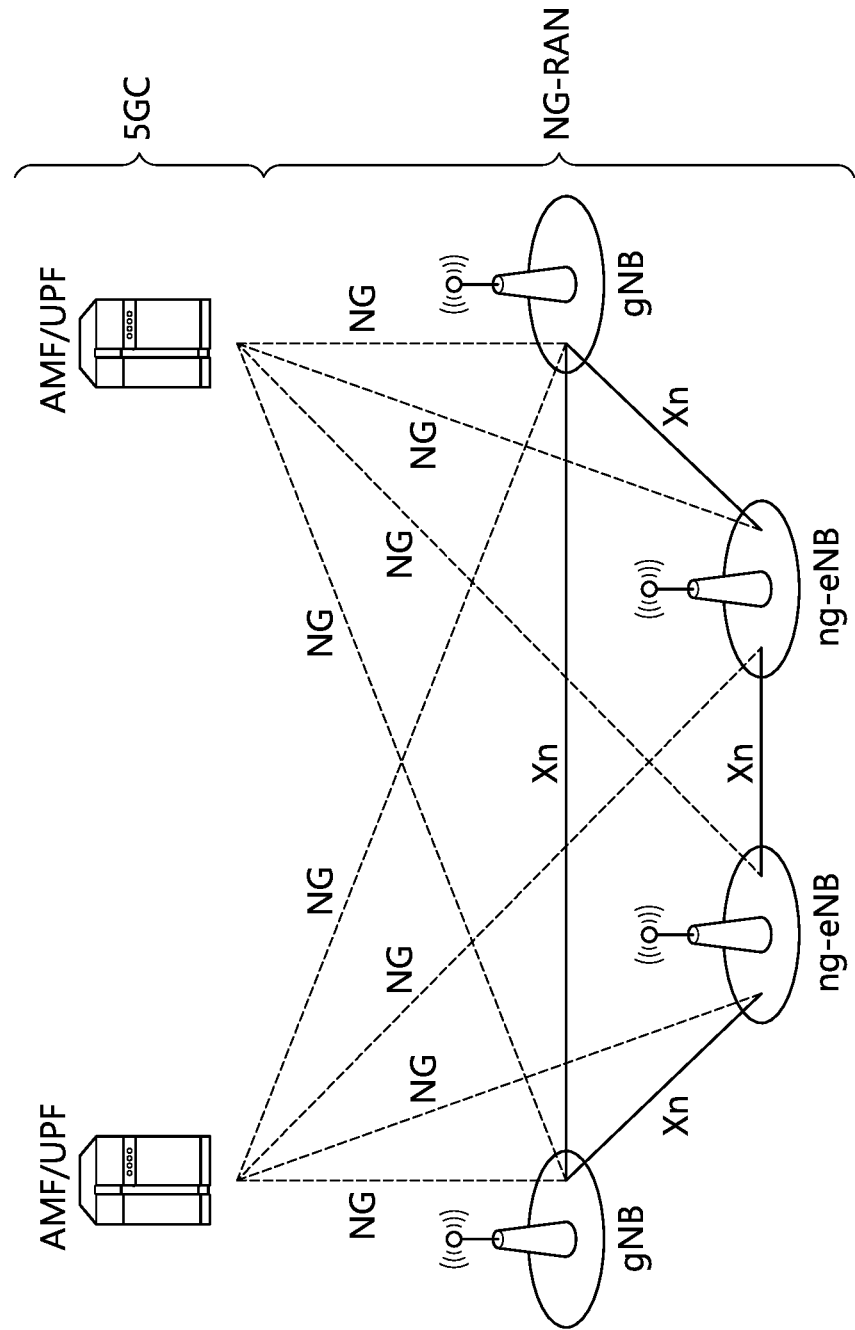
FIG. 2 shows an NG-RAN architecture.

FIG. 2 shows an NG-RAN architecture. Referring to FIG. 2, the NG-RAN includes at least one NG-RAN node. The NG-RAN node includes at least one gNB and/or at least one ng-eNB. The gNB provides NR user plane and control plane protocol terminations towards the UE. The ng-eNB provides E-UTRA user plane and control plane protocol terminations towards the UE. The gNBs and ng-eNBs are interconnected with each other by means of the Xn interface. The gNBs and ng-eNBs are also connected by means of the NG interfaces to the 5G CN. More specifically, the gNBs and ng-eNBs are connected to the access and mobility management function (AMF) by means of the NG-C interface and to the user plane function (UPF) by means of the NG-U interface.

The gNB and ng-eNB host the following functions:

Functions for radio resource management: Radio bearer control, radio admission control, connection mobility control, dynamic allocation of resources to UEs in both uplink and downlink (scheduling);

Internet protocol (IP) header compression, encryption and integrity protection of data;

Selection of an AMF at UE attachment when no routing to an AMF can be determined from the information provided by the UE;

Routing of user plane data towards UPF(s);

Routing of control plane information towards AMF;

Connection setup and release;

Scheduling and transmission of paging messages;

Scheduling and transmission of system broadcast information (originated from the AMF or operations & maintenance (O&M));

Measurement and measurement reporting configuration for mobility and scheduling;

Transport level packet marking in the uplink;
Session management;
Support of network slicing;
QoS flow management and mapping to data radio bearers;
Support of UEs in RRC_INACTIVE state;
Distribution function for non-assess stratum (NAS) messages;
Radio access network sharing;
Dual connectivity;
Tight interworking between NR and E-UTRA.
The AMF hosts the following main functions:
NAS signaling termination;
NAS signaling security;
AS security control;
Inter CN node signaling for mobility between 3GPP access networks;
Idle mode UE reachability (including control and execution of paging retransmission);
Registration area management;
Support of intra-system and inter-system mobility;
Access authentication;
Access authorization including check of roaming rights;
Mobility management control (subscription and policies);
Support of network slicing;
Session management function (SMF) selection.
The UPF hosts the following main functions:
Anchor point for Intra-/Inter-radio access technology (RAT) mobility (when applicable);
External protocol data unit (PDU) session point of interconnect to data network;
Packet routing & forwarding;
Packet inspection and user plane part of policy rule enforcement;
Traffic usage reporting;
Uplink classifier to support routing traffic flows to a data network;
Branching point to support multi-homed PDU session;
QoS handling for user plane, e.g. packet filtering, gating, UL/DL rate enforcement;
Uplink traffic verification (service data flow (SDF) to QoS flow mapping);
Downlink packet buffering and downlink data notification triggering.
The SMF hosts the following main functions:
Session management;
UE IP address allocation and management;
Selection and control of UP function;
Configures traffic steering at UPF to route traffic to proper destination;
Control part of policy enforcement and QoS;
Downlink data notification.

In what follows, multi-RAT dual connectivity will be described. NG-RAN supports multi-RAT dual connectivity configured so that a UE in the RRC_CONNECTED state with multiple RX/TX may use radio resources provided by two separate schedulers. Multi-RAT dual connectivity is generalization of the E-UTRA dual connectivity. Two separate schedulers are located at two different NG-RAN nodes connected to each other through a non-ideal backhaul. One of the two different NG-RAN nodes performs the role of a master node (MN), and the other one performs the role of a secondary node (SN). In other words, one scheduler is located at the MN while the other scheduler is located at the SN. The two different NG-RAN nodes provide either the E-UTRA connectivity (when the NG-RAN node is an ng-eNB) or NR connectivity (when the NG-RAN node is a gNB). The ng-eNB is a node that provides the NR user plane and control plane protocol termination toward a UE and operates as an SN in the E-UTRAN-NR dual connectivity (EN-DC). The gNB is a node that provides the E-UTRA user plane and control plane protocol termination toward a UE and is connected to 5G CN through an NG interface. The MN and SN are connected to each other through a network interface, and at least the MN is connected to the core network. Although multi-RAT dual connectivity in the present disclosure has been designed based on a non-ideal backhaul between different nodes, the multi-RAT dual connectivity may also be used for an ideal backhaul.

Figure 3:
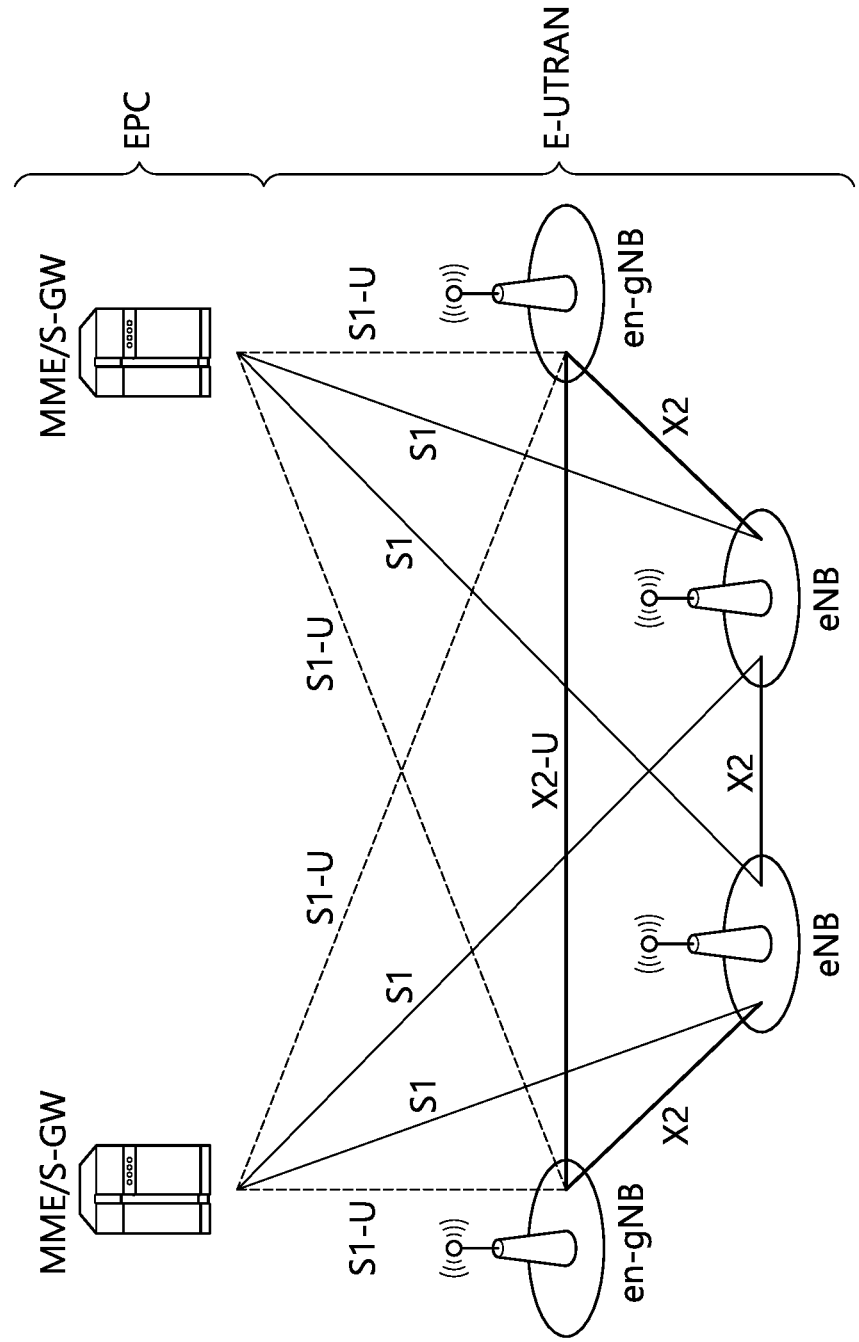
FIG. 3 shows EN-DC architecture.

FIG. 3 shows EN-DC architecture. The E-UTRAN supports multi-RAT dual connectivity through EN-DC, where a UE is connected to one eNB operating as an MN and one en-gNB operating as an SN. An eNB is connected to EPC through S1 interface and connected to en-gNB through X2 interface. The en-gNB may be connected to the EPC through S1-U interface and connected to a different en-gNB through X2-U interface.

The 5G CN also supports multi-RAT dual connectivity. An NG-RAN supports NG-RAN E-UTRA-NR dual connectivity (NGEN-DC), where a UE is connected to one ng-eNB operating as an MN and one gNB operating as an SN. The ng-eNB is connected to the 5G CN, and the gNB is connected to the ng-eNB through Xn interface. Also, the NG-RAN supports NR-E-UTRA dual connectivity (NE-DC), where a UE is connected to one gNB operating as an MN and one ng-eNB operating as an SN. The gNB is connected to the 5G CN, and ng-eNB is connected to the gNB through Xn interface.

To support the aforementioned multi-RAT dual connectivity and/or tight interworking of LTE/NR, various disposition scenarios for LTE and NR may be considered.

Figure 4:
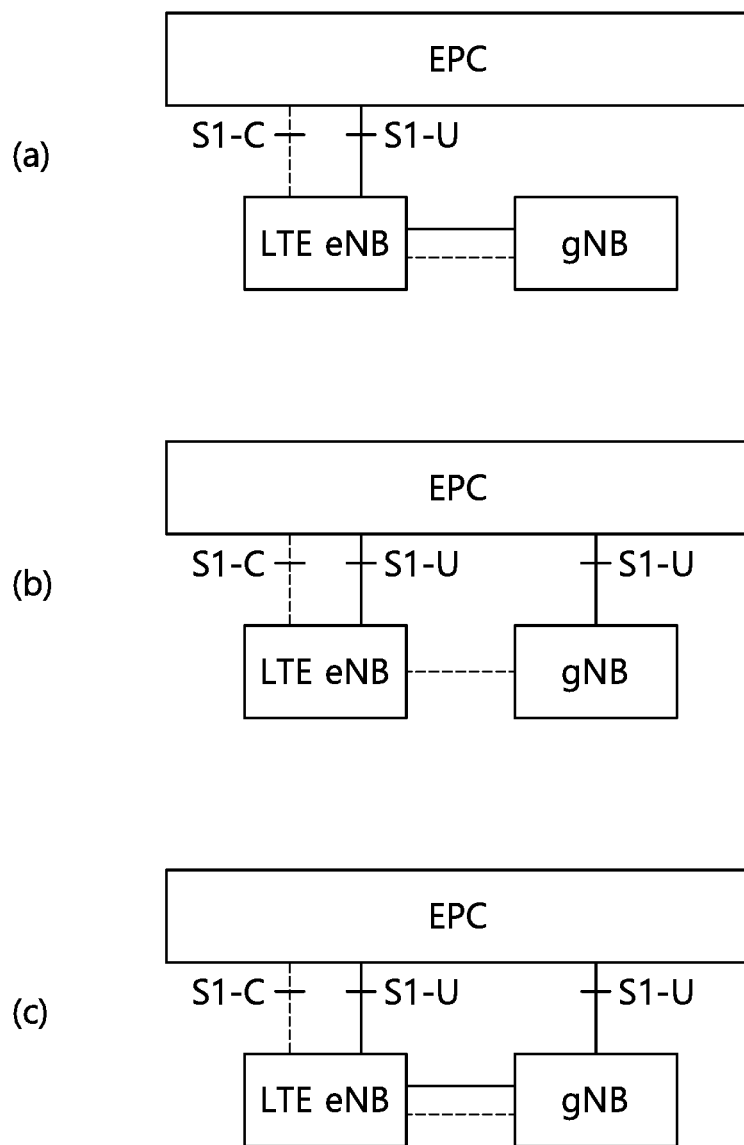
FIG. 4 shows option 3/3a/3x of the deployment scenario for tight interworking of LTE/NR.

FIG. 4 shows option 3/3a/3x of the deployment scenario for tight interworking of LTE/NR. FIG. 4(*a*) may be referred to as option 3, FIG. 4(*b*) as option 3a, and FIG. 4(*c*) as option 3x. In option 3/3a/3x, the LTE eNB is connected to the EPC with non-standalone NR. In other words, NR control plane is not directly connected to the EPC but connected through the LTE eNB. The NR user plane is connected to the EPC via the LTE eNB (option 3) or directly via the S1-U interface (option 3a). Or the user plane connected directly through the S1-U interface is split to the LTE eNB in the gNB (option 3x). The option 3/3a/3x correspond to the EN-DC architecture described in detail with reference to FIG. 3.

Figure 5:
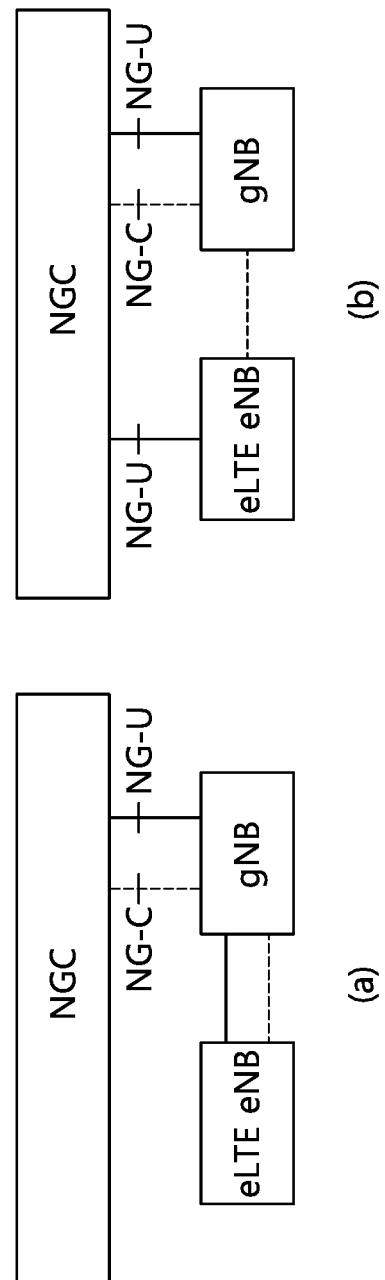
FIG. 5 shows option 4/4a of the deployment scenario for tight interworking of LTE/NR.

FIG. 5 shows option 4/4a of the deployment scenario for tight interworking of LTE/NR. FIG. 5(*a*) may be referred to as option 4, and FIG. 5(*b*) as option 4a. In option 4/4a, the gNB is connected to the NGC with non-standalone E-UTRA. In other words, the E-UTRA control plane is not directly connected to the NGC but connected through the gNB. The E-UTRA user plane is connected to the NGC via the gNB (option 4) or directly through the NG-U interface (option 4a). The option 4/4a correspond to the option 3/3a with the E-UTRA and NR interchanged.

Figure 6:
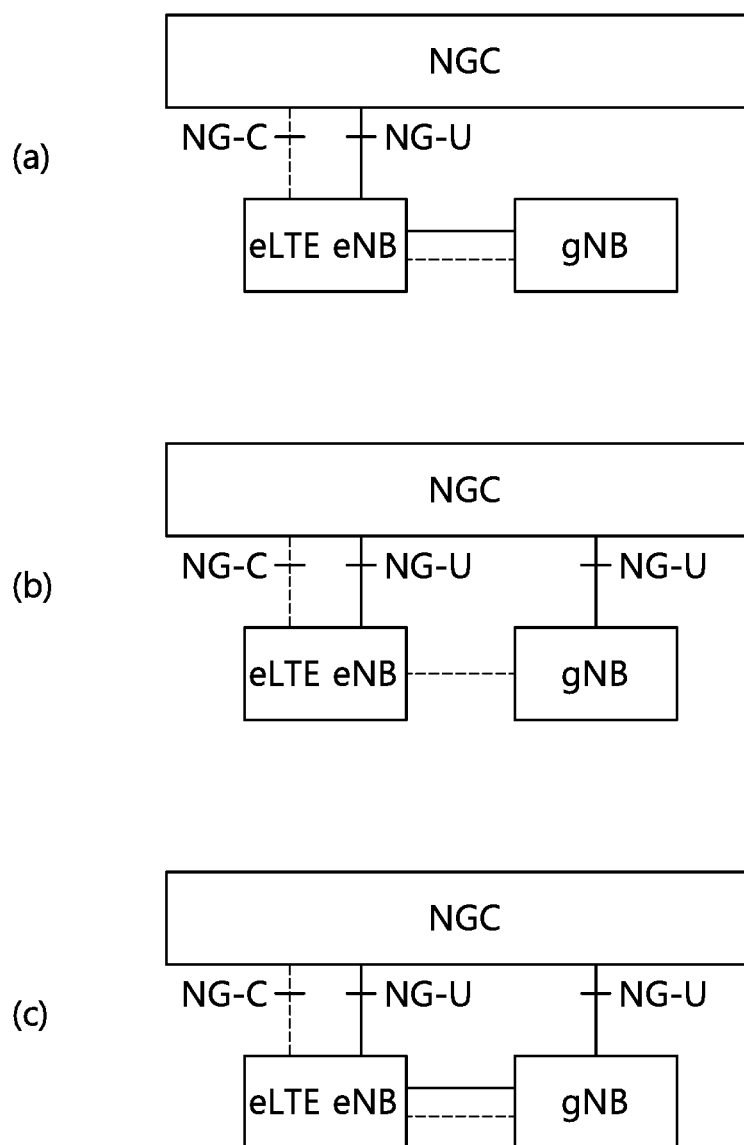
FIG. 6 shows option 7/7a/7x of the deployment scenario for tight interworking of LTE/NR.

FIG. 6 shows option 7/7a/7x of the deployment scenario for tight interworking of LTE/NR. FIG. 6(*a*) may be referred to as option 7, FIG. 6(*b*) as option 7a, and FIG. 6(*c*) as option 7x. In option 7/7a/7x, the eLTE eNB (namely ng-eNB) is connected to the NGC with non-standalone NR. In other words, NR control plane is not directly connected to the NGC but connected through the eLTE eNB. The NR user plane is connected to the NGC via the eLTE eNB (option 7) or directly through the NG-U interface (option 7a). Or the user plane connected directly through the NG-U interface is split to the eLTE eNB in the gNB (option 7x).

Figure 7:
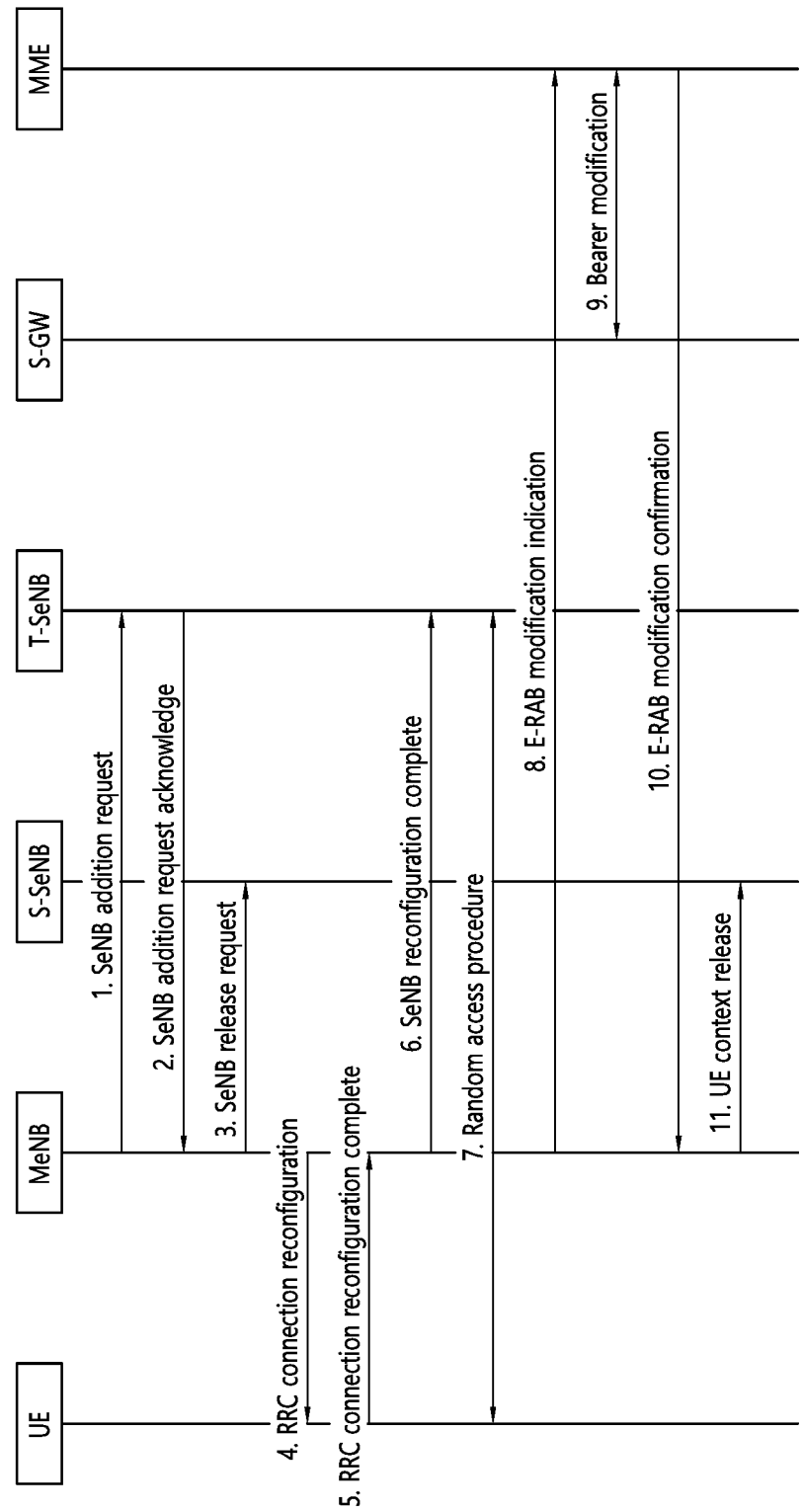
FIG. 7 shows a secondary eNB (SeNB) change procedure in the LTE.

FIG. 7 shows a secondary eNB (SeNB) change procedure in the LTE. The SeNB change procedure is initiated by master eNB (MeNB). The SeNB change procedure is used to transfer UE context from a source SeNB to a target SeNB and to change the secondary cell group (SCG) configuration within the UE from one SeNB to another. A signaling flow for the SeNB change procedure is described as follows.

1/2. The MeNB initiates the SeNB change procedure by requesting the target SeNB (T-SeNB) to allocate resources for the UE through the SeNB addition preparation procedure. The MeNB includes the SCG configuration of the old SeNB in the SeNB addition request message. If forwarding is needed, the T-SeNB provides forwarding addresses to the MeNB.

3. If allocation of the T-SeNB resources is successful, the MeNB initiates release of the S-SeNB resources towards the UE and S-SeNB. If Make-Before-Break SeNB change is configured, the S-SeNB determines when to stop transmission to the UE. If data forwarding is needed, the MeNB provides data forwarding addresses to the S-SeNB. Either direct data forwarding or indirect data forwarding is used for SCG bearer. Only indirect data forwarding is used for split bearer. Reception of the SeNB release request message triggers the S-SeNB to stop providing user data to the UE and to start data forwarding if applicable.

4/5. The MeNB triggers the UE to apply the new configuration. The MeNB indicates the new configuration in the RRCConnectionReconfiguration message towards the UE. In case the UE is unable to comply with (part of) the configuration included in the RRCConnectionReconfiguration message, the UE performs the reconfiguration failure procedure.

If Make-Before-Break SeNB change is configured, the connection to the S-SeNB is maintained until the UE performs the initial uplink (UL) transmission to the target cell after reception of the RRCConnectionReconfiguration message including Mobility ControlInforSCG.

6. If the RRC connection reconfiguration procedure is successful, the MeNB informs the T-SeNB.

7. The UE performs synchronization with the T-SeNB.

If applicable, data forwarding from the S-SeNB is performed. It may be initiated as early as the S-SeNB receives the SeNB release request message from the MeNB.

8-10. If one of bearer contexts is configured with the SCG bearer option in the S-SeNB, path update is triggered by the MeNB.

11. Upon reception of the UE context release message, the S-SeNB may release radio and C-plane related resources associated with the UE context. Also, any ongoing data forwarding may be continued.

FIG. 7 reveals a problem that the SeNB change procedure in the LTE is triggered only by the MeNB. This is not efficient from a procedural point of view. Also, in the EN-DC or MR-DC due to interworking of LTE/NR, it may be needed for each node belonging to separate RAT to be able to initiate the SeNB change procedure.

To solve the problem above, the present disclosure proposes a secondary node change procedure for the EN-DC or MR-DC due to interworking of LTE/NR, which is initiated by the secondary node rather than the master node. In the embodiments below, the master node and secondary node may be any one of network nodes of the LTE or NR. For example, the master node may be any one of eNB, gNB, and ng-eNB while the secondary node may also be any one of eNB, gNB, en-gNB, and ng-eNB.

1. Embodiment 1-1

Figure 8:
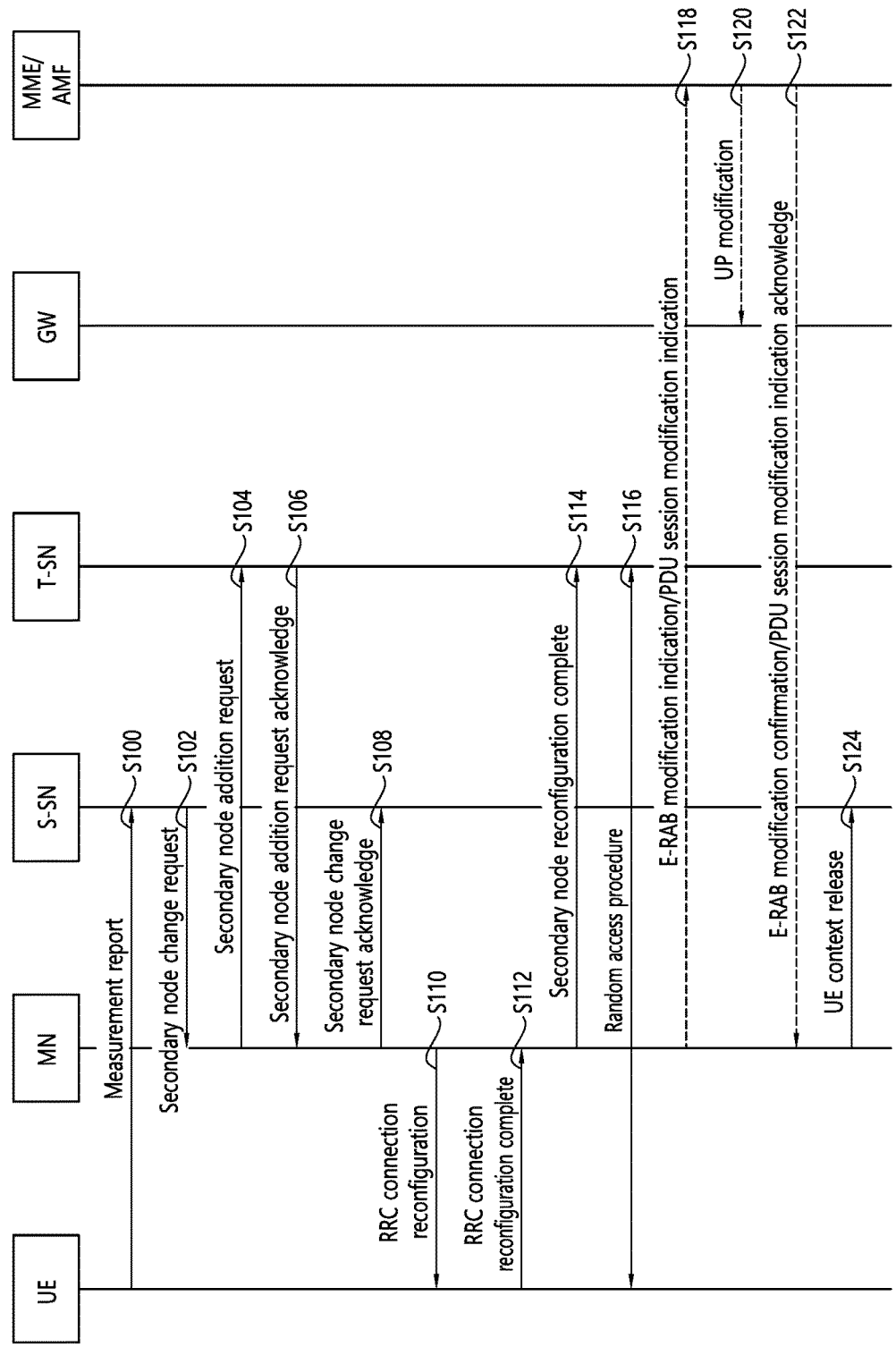
FIG. 8 shows a method for performing a secondary node change procedure initiated by a secondary node according to an embodiment of the present disclosure.

FIG. 8 shows a method for performing a secondary node change procedure initiated by a secondary node according to an embodiment of the present disclosure. In FIG. 8, MN denotes a master node, S-SN denotes a source secondary node, and T-SN denotes a target secondary node.

In step S100, a source secondary node receives the measurement report on neighboring nodes from a UE. The source secondary node decides to offload services of the UE to one of its neighbor nodes.

In step S102, the source secondary node transmits a secondary node change request message to a master node. The secondary node change request message may include at least one of the followings.

(1) Indication of secondary node change request
(2) The SCG-configuration information
(3) Measurement report on its neighbor nodes and/or its own cells
(4) Identities (IDs) of target secondary nodes: The IDs of target secondary nodes may be recommended/determined based on the decision of the source secondary node. The IDs of target secondary nodes may be realized by list of cell ID. The cell may correspond to one cell of the node. The list of cell IDs may be ranked based on the measurement report regarding the radio quality. The list of cell IDs may be ranked from high to low or from low to high. In this way, the master node can make a decision on selecting the proper target secondary node.
(5) PDU information on the flows to be offloaded to other node Upon receiving the secondary node change request message from the source secondary node, the master node makes a decision on whether to accept the secondary node change request or not. If the master node decides to accept the secondary node change request, the master node may also decide a target secondary node. In step S104, the master node transmits a secondary node addition request message to the target secondary node. The secondary node addition request message may include at least one of the followings.

(1) The SCG-configuration information
(2) PDU information on the flows to be offloaded to the target secondary node Upon receiving the secondary node addition request message from the master node, the target secondary node makes a decision on whether to accept the secondary node addition request or not. The target secondary node may decide whether to accept the secondary node addition request or not based on information received via the secondary node addition request message and/or its radio resource situation.

If the target secondary node decides to accept the secondary node addition request, in step S106, the target secondary node transmits a secondary node addition request acknowledge message to the master node. The secondary node addition request acknowledge message may include at least one of the followings.

(1) The SCG-configuration
(2) The list of accepted and rejected PDU sessions/flows
(3) Data forwarding addresses for the accepted PDU sessions/flows If the target secondary node decides to reject the secondary node addition request, the target secondary node may transmit a secondary node addition reject message to the master node, which is not disclosed in FIG. 8. The secondary node addition reject message may include a reason of rejection, e.g. no radio resource.

Upon receiving secondary node addition request acknowledge message from the target secondary node, the master node decides whether to change secondary node from the source secondary node to the target secondary node or not. If the master node decides to change secondary node from the source secondary node to the target secondary node, in step S108, the master node transmits a secondary node change acknowledge message to the source secondary node. The secondary node change acknowledge message may include at least one of the followings.

(1) Indication on accept of secondary node change request
(2) The ID of the target secondary node
(3) The SCG-configuration of the target secondary node
(4) The list of accepted and rejected PDU sessions/flows from the target secondary node
(5) Data forwarding addresses for the accepted PDU sessions/flows In step S110, the master node transmits a RRCConnectionReconfiguration message to the UE. The RRCConnectionReconfiguration message may include RRC configuration information of the master node and/or RRC configuration information of the target secondary node. Upon receiving the RRCConnectionReconfiguration message from the master node, in step S112, the UE transmits a RRCConnectionReconfigurationComplete message to the master node. If the UE is unable to comply with (part of) the configuration included in the RRCConnectionReconfiguration message, the UE may perform the reconfiguration failure procedure.

If the RRC connection reconfiguration procedure was successful, in step S114, the master node informs the target secondary node by transmitting a secondary node reconfiguration complete message to the target secondary node.

In step S116, the UE synchronizes to the target secondary node by performing a random access procedure.

In step S118 to S122, if one of the contexts was configured with the SCG option/SCG split option at the source secondary node, path update may be triggered by the master node.

In step S124 the master node transmits a UE Context Release message to the source secondary node. Upon reception of the UE Context Release message, the source secondary node can release radio and C-plane related resource associated to the UE context. Any ongoing data forwarding may continue.

Figure 9:
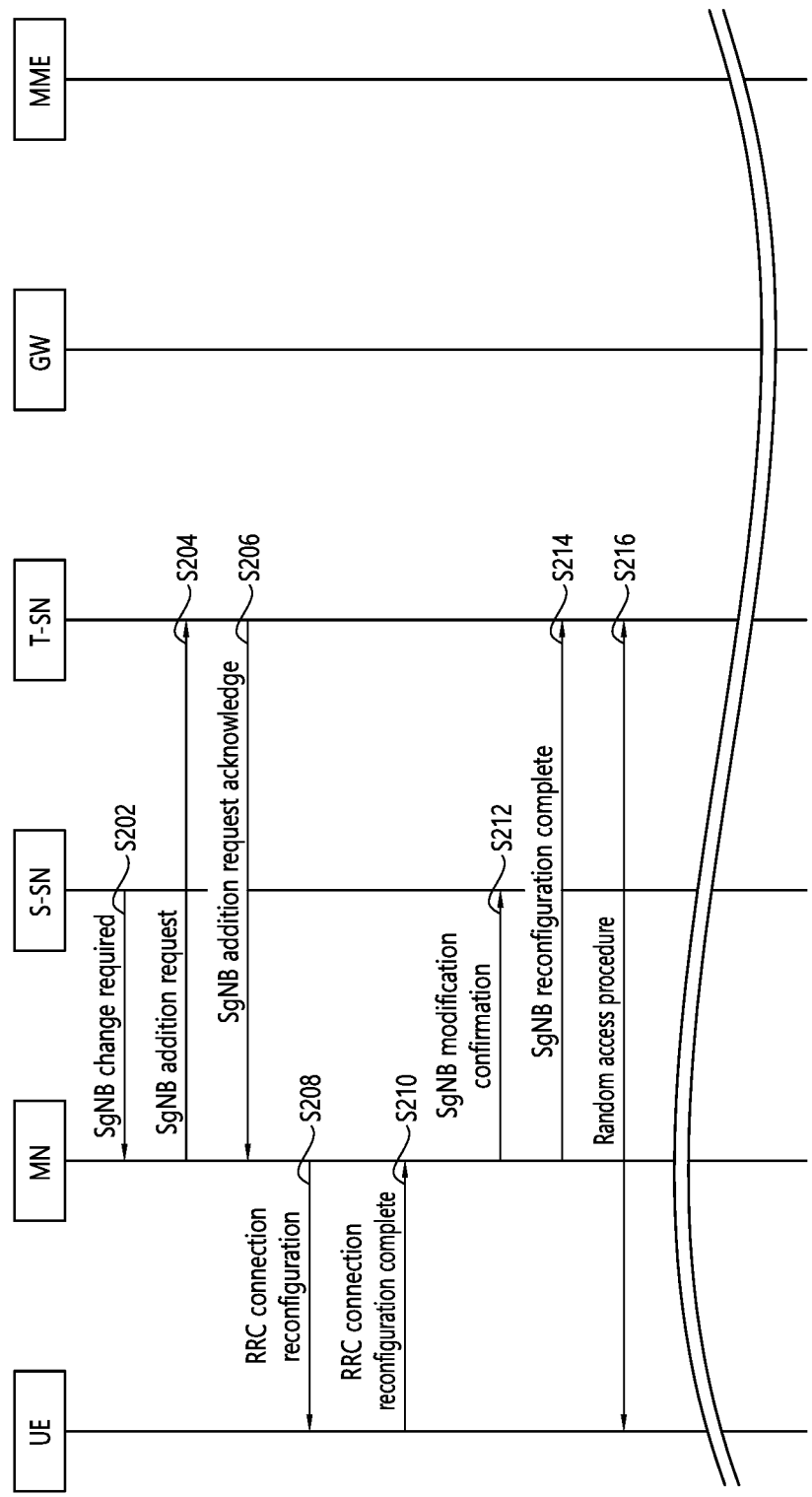
FIGS. 9 and 10 shows a method for performing a secondary node change procedure initiated by a secondary node according to another embodiment of the present disclosure.
Figure 10:
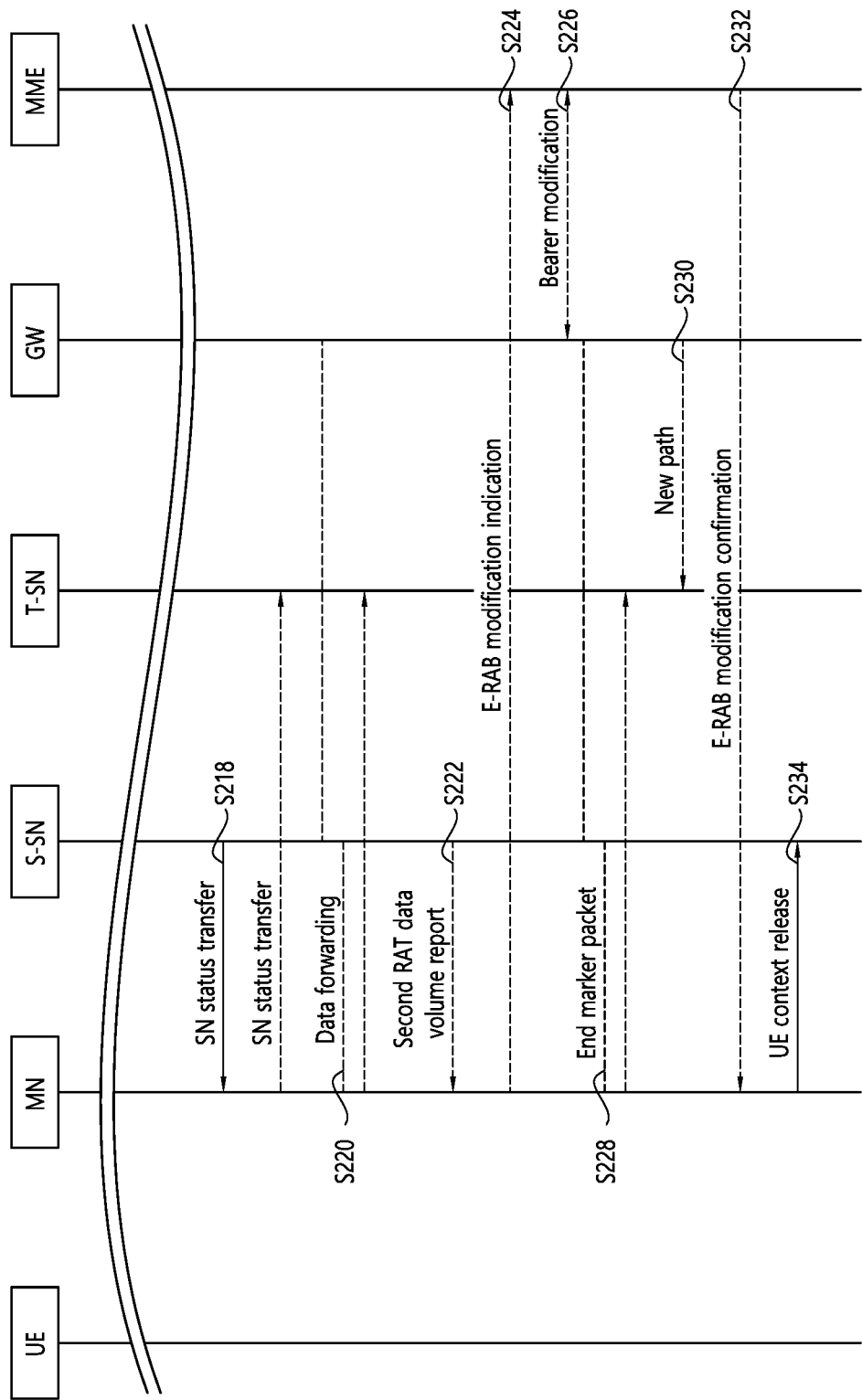

FIGS. 9 and 10 shows a method for performing a secondary node change procedure initiated by a secondary node according to another embodiment of the present disclosure. In this embodiment, EN-DC architecture described in FIG. 3 is assumed. That is, it is assumed in this embodiment that the master node is an eNB and the source/target secondary node is en-gNB. In FIGS. 9 and 10, MN denotes a master node, S-SN denotes a source secondary node, and T-SN denotes a target secondary node.

First, FIG. 9 is described.

In step S202, the source secondary node initiates the secondary node change procedure by sending SgNB Change Required message to the master node. Step S202 may correspond to step S102 in FIG. 8. The SgNB Change Required message may contain target secondary node ID information. The SgNB Change Required message may include the SCG configuration (to support delta configuration) and measurement results related to the target secondary node.

Table 1 shows an example of the SgNB Change Required message. This message is sent by the en-gNB to the MeNB to request the change of en-gNB for a specific UE.

TABLE 1

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB. | YES | reject |
| SgNB UE X2AP ID | M | | en-gNB UE X2AP ID 9.2.100 | Allocated at the en-gNB. | YES | reject |
| Target SgNB ID Information | M | | 9.2.102 | | YES | reject |
| Cause | M | | 9.2.6 | | YES | ignore |
| SgNB to MeNB Container | M | | OCTET STRING | | YES | reject |

Referring to Table 1, the SgNB Change Required message includes "Target SgNB ID Information" information element (IE). The Target SgNB ID Information IE may correspond to IDs of target secondary nodes, disclosed in step S102 in FIG. 8. Table 2 shows an example of the Target SgNB ID Information IE. This IE contains the target SgNB ID used by MeNB to find the target en-gNB.

TABLE 2

| IE/Group Name | Presence | Range | IE type and reference | Semantics description | Criticality | Assigned Criticality |
|---|---|---|---|---|---|---|
| Target SgNB ID | M | | reference | | | |

In step S204, the master node requests the target secondary node to allocate resources for the UE by transmitting a SgNB Addition Request message to the target secondary node. Step S204 may correspond to step S104 in FIG. 8. The SgNB Addition Request message may include the measurement results related to the target secondary node received from the source secondary node. Table 3 shows an example of the SgNB Addition Request message. This message is sent by the MeNB to the en-gNB to request the preparation of resources for EN-DC operation for a specific UE.

TABLE 3

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| NR UE Security Capabilities | M | | 9.2.107 | | YES | reject |

TABLE 3-continued

| IE/Group Name | Presence | Range | IE type and reference | Semantics description | Criticality | Assigned Criticality |
|---|---|---|---|---|---|---|
| SgNB Security Key | M | | 9.2.101 | The S-KgNB which is provided by the MeNB, see TS 33.401 [18]. | YES | reject |
| SgNB UE Aggregate Maximum Bit Rate | M | | UE Aggregate Maximum Bit Rate 9.2.12 | The UE Aggregate Maximum Bit Rate is split into MeNB UE Aggregate Maximum Bit Rate and SgNB UE Aggregate Maximum Bit Rate which are enforced by MeNB and en-gNB respectively. | YES | reject |
| Serving PLMN | O | | PLMN Identity 9.2.4 | The serving PLMN of the SCG in the en-gNB. | YES | ignore |
| Handover Restriction List | O | | 9.2.3 | | YES | ignore |
| E-RABs To Be Added List | | 1 | | | YES | reject |
| >E-RABs To Be Added Item | | 1 . . . <maxnoof Bearers> | | | EACH | reject |
| >>E-RAB ID | M | | 9.2.23 | | — | |
| >>EN-DC Resource Configuration | M | | EN-DC Resource Configuration 9.2.108 | Indicates the PDCP and Lower Layer MCG/SCG configuration. | — | |
| >>CHOICE Resource Configuration | M | | | | | |
| >>>PDCP present in SN | | | | This choice tag is used if the PDCP at SgNB IE in the EN-DC Resource Configuration IE is set to the value "present". | | |
| >>>Full E-RAB Level QoS Parameters | M | | E-RAB Level QoS Parameters 9.2.9 | Includes E-RAB level QoS parameters as received on S1-MME. | — | |
| >>>>Maximum MCG admittable E-RAB Level QoS Parameters | C-ifMCG andSCGpresent | | E-RAB Level QoS Parameters 9.2.9 | Includes the E-RAB Level QoS parameters admittable by the MCG | — | |
| >>>>DL Forwarding | O | | 9.2.5 | | — | |
| >>>>MeNB DL GTP TEID at MCG | C-ifMCG present | | GTP Tunnel Endpoint 9.2.1 | MeNB endpoint of the X2-U transport bearer at MCG. For | — | |

TABLE 3-continued

| IE/Group Name | Presence | Range | IE type and reference | Semantics description | Criticality | Assigned Criticality |
|---|---|---|---|---|---|---|
| | | | | delivery of DL PDCP PDUs. | | |
| >>>>S1 UL GTP Tunnel Endpoint | M | | GTP Tunnel Endpoint 9.2.1 | SGW endpoint of the S1-U transport bearer. For delivery of UL PDUs from the en-gNB. | — | |
| >>>PDCP not present in SN | | | | This choice tag is used if the PDCP at SgNB IE in the EN-DC Resource Configuration IE is set to the value "not present". | | |
| >>>>Requested SCG E-RAB Level QoS Parameters | M | | E-RAB Level QoS Parameters 9.2.9 | Includes E-RAB level QoS parameters requested to be provided by the SCG | — | |
| >>>>MeNB UL GTP TEID at PDCP | M | | GTP Tunnel Endpoint 9.2.1 | MeNB endpoint of the X2-U transport bearer. For delivery of UL PDCP PDUs. | — | |
| >>>>RLC Mode | M | | RLC Mode 9.2.119 | Indicates the RLC mode. | — | |
| >>>>UL configuration | C-ifMCGandSCGpresent | | 9.2.118 | Information about UL usage in the en-gNB. | — | |
| MeNB to SgNB Container | M | | OCTET STRING | Includes the SCG-ConfigInfo message as defined in TS 38.331 [31]. | YES | reject |
| SgNB UE X2AP ID | O | | en-gNB UE X2AP ID 9.2.100 | Allocated at the en-gNB. | YES | reject |
| Expected UE Behaviour | O | | 9.2.70 | | YES | ignore |
| MeNB UE X2AP ID Extension | O | | Extended eNB UE X2AP ID 9.2.86 | Allocated at the MeNB. | YES | reject |
| Requested MCG split SRBs | O | | ENUMERATED (srb1, srb2, srb1&2, . . .) | Indicates that resources for MCG Split SRB are requested. | YES | reject |
| MeNB Resource Coordination Information | O | | 9.2.116 | Information used to coordinate resources utilisation | YES | ignore |

TABLE 3-continued

| IE/Group Name | Presence | Range | IE type and reference | Semantics description | Criticality | Assigned Criticality |
|---|---|---|---|---|---|---|
| | | | | between MeNB and en-gNB. | | |

In step S206, the target secondary node transmits a SgNB Addition Request Acknowledge message to the master node. Step S206 may correspond to step S106 in FIG. 8. If forwarding is needed, the target secondary node may provide forwarding addresses to the master node in the SgNB Addition Request Acknowledge message. Table 4 shows an example of the SgNB Addition Request Acknowledge message. This message is sent by the en-gNB to confirm the MeNB about the SgNB addition preparation.

TABLE 4

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB. | YES | reject |
| SgNB UE X2AP ID | M | | en-gNB UE X2AP ID 9.2.100 | Allocated at the en-gNB. | YES | reject |
| E-RABs Admitted To Be Added List | | 1 | | | YES | ignore |
| >E-RABs Admitted To Be Added Item | | 1 ... <maxnoof Bearers> | | | EACH | ignore |
| >>E-RAB ID | M | | 9.2.23 | | — | |
| >>EN-DC Resource Configuration | M | | EN-DC Resource Configuration 9.2.108 | Indicates the PDCP and Lower Layer MCG/SCG configuration. | — | |
| >>CHOICE Resource Configuration | M | | | | | |
| >>>PDCP present in SN | | | | This choice tag is used if the PDCP at SgNB IE in the EN-DC Resource Configuration IE is set to the value "present". | | |
| >>>>S1 DL GTP TEID at the SgNB | M | | GTP Tunnel Endpoint 9.2.1 | SgNB endpoint of the S1 transport bearer. For delivery of DL PDUs. | — | |
| >>>>SgNB UL GTP TEID at PDCP | C-ifMCG present | | GTP Tunnel Endpoint 9.2.1 | SgNB endpoint of the X2-U transport bearer at PDCP. For delivery of UL PDCP PDUs. | — | |
| >>>>RLC Mode | M | | RLC Mode 9.2.119 | Indicates the RLC mode. | — | |
| >>>>DL Forwarding GTP Tunnel Endpoint | O | | GTP Tunnel Endpoint 9.2.1 | Identifies the X2 transport bearer used for | — | |

TABLE 4-continued

| IE/Group Name | Presence | Range | IE type and reference | Semantics description | Criticality | Assigned Criticality |
|---|---|---|---|---|---|---|
| >>>>UL Forwarding GTP Tunnel Endpoint | O | | GTP Tunnel Endpoint 9.2.1 | forwarding of DL PDUs Identifies the X2 transport bearer used for forwarding of UL PDUs | — | |
| >>>>Requested MCG E-RAB Level QoS Parameters | C-ifMCG andSC Gpresent | | E-RAB Level QoS Parameters 9.2.9 | Includes E-RAB level QoS parameters requested to be provided by the MCG. | — | |
| >>>>UL configuration | C-ifMCG andSC Gpresent | | 9.2.118 | Information about UL usage in the en-gNB. | — | |
| >>>PDCP not present in SN | | | | This choice tag is used if the PDCP at SgNB IE in the EN-DC Resource Configuration IE is set to the value "not present". | | |
| >>>>SgNB DL GTP TEID at SCG | M | | GTP Tunnel Endpoint 9.2.1 | SgNB endpoint of the X2-U transport bearer at the SCG. For delivery of DL PDCP PDUs. | — | — |
| E-RABs Not Admitted List | O | | E-RAB List 9.2.28 | A value for E-RAB ID shall only be present once in E-RABs Admitted List IE and in E-RABs Not Admitted List IE. | YES | ignore |
| SgNB to MeNB Container | M | | OCTET STRING | Includes the SCG-Config message as defined in TS 38.331[31]. | YES | reject |
| Criticality Diagnostics | O | | 9.2.7 | | YES | ignore |
| GW Transport Layer Address | O | | BIT STRING (1 . . . 160, . . .) | Indicating GW Transport Layer Address. | YES | ignore |
| MeNB UE X2AP ID Extension | O | | Extended eNB UE X2AP ID 9.2.86 | Allocated at the MeNB | YES | reject |
| Tunnel Information for BBF | O | | Tunnel Information 9.2.89 | Indicating eNB's Local IP Address assigned by the broadband access provider, UDP port Number. | YES | ignore |
| Admitted MCG split SRBs | O | | ENUMER-ATED (srb1, | Indicates admitted SRBs | YES | reject |

TABLE 4-continued

| IE/Group Name | Presence | Range | IE type and reference | Semantics description | Criticality | Assigned Criticality |
|---|---|---|---|---|---|---|
| SgNB Resource Coordination Information | O |  | srb2, srb1&2, . . .) 9.2.117 | Information used to coordinate resources utilisation between en-gNB and MeNB. | YES | ignore |

In step S208, the master node triggers the UE to apply the new configuration. The maser node indicates the new configuration to the UE in the RRCConnectionReconfiguration message including the NR RRC configuration message generated by the target secondary node. Step S208 may correspond to step S110 in FIG. 8. In step S210, the UE applies the new configuration, and sends the RRCConnectionReconfigurationComplete message. The RRCConnectionReconfigurationComplete message may include the encoded NR RRC response message for the target secondary node. Step S210 may correspond to step S112 in FIG. 8. If the UE is unable to comply with (part of) the configuration included in the RRCConnectionReconfiguration message, the UE performs the reconfiguration failure procedure.

If the allocation of target secondary node resources was successful, in step S212, the master node confirms the release of the source secondary node resources by transmitting a SgNB Change Confirm message to the source secondary node. Step S212 may correspond to step S108 in FIG. 8. If data forwarding is needed, the master node may provide data forwarding addresses to the source SN in the SgNB Change Confirm message. Reception of the SgNB Change Confirm message triggers the source secondary node to stop providing user data to the UE and, if applicable, to start data forwarding.

If the RRC connection reconfiguration procedure was successful, in step S214, the master node informs the target secondary node via SgNB Reconfiguration Complete message with the encoded NR RRC response message for the target secondary node. Step S214 may correspond to step S114 in FIG. 8.

In step S216, the UE synchronizes to the target secondary node. Step S216 may correspond to step S116 in FIG. 8.

Now, FIG. 10 is described. Procedures in FIG. 10 is performed following procedures in FIG. 9.

In step S218 and S220, if applicable, data forwarding from the source secondary node takes place. It may be initiated as early as the source secondary node receives the SgNB Change Confirm message from the master node.

In step S222, the source secondary node sends the Secondary RAT Data Volume Report message to the master node and includes the data volumes delivered to the UE over the NR radio for the related E-UTRAN radio access bearers (E-RABs).

In steps S224 to S232, if one of the bearer was terminated at the source secondary node, path update is triggered by the master node. Steps S224 to S232 may correspond to step S118 to S122 in FIG. 8.

In step S234, upon reception of the UE Context Release message, the source secondary node can release radio and C-plane related resource associated to the UE context. Any ongoing data forwarding may continue. Step S234 may correspond to step S124 in FIG. 8.

Figure 11:
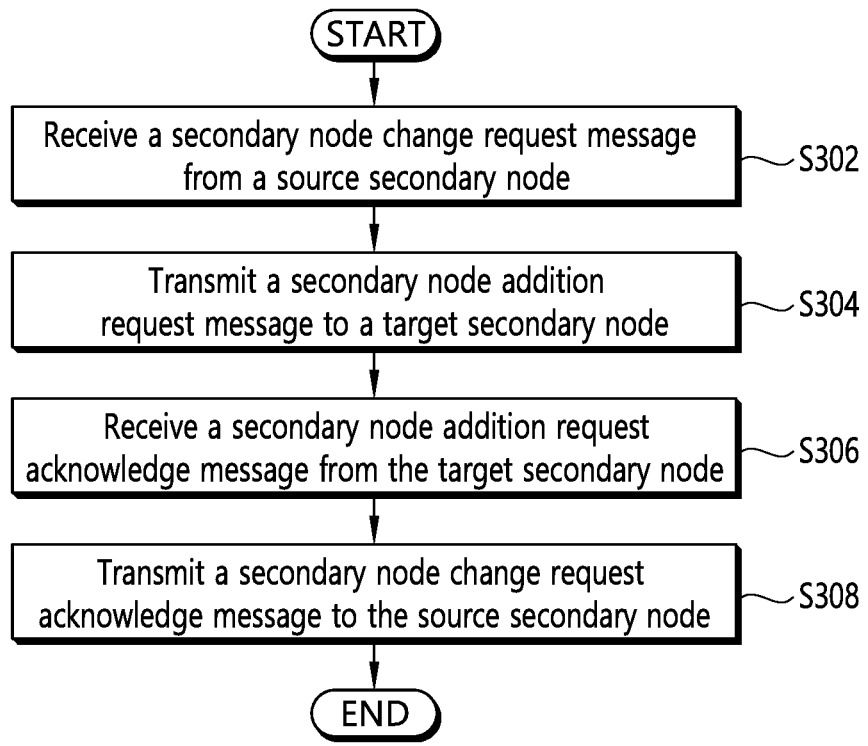
FIG. 11 shows a method for performing a secondary node change procedure initiated by a secondary node according to another embodiment of the present disclosure.

FIG. 11 shows a method for performing a secondary node change procedure initiated by a secondary node according to another embodiment of the present disclosure. The embodiments described in FIGS. 8 to 10 may be applied to this embodiment. In this embodiment, the master node may be one of an eNB, a gNB, an en-gNB or ng-eNB, and the source secondary node and the target secondary node may also be one of an eNB, a gNB, an en-gNB or ng-eNB.

In step S302, the master node receives, from the source secondary node, a secondary node change request message. Step S302 may correspond to step S102 in FIG. 8. The secondary node change request message may include IDs of target secondary nodes. The IDs of target secondary nodes may include a list of cell IDs. The list of cell IDs is ranked based on a measurement report, which is received by the source secondary node from a UE. Furthermore, the secondary node change request message includes at least one of an indication of secondary node change request, SCG configuration information, a measurement report on cells of neighbor nodes of the source secondary node, a measurement report on cells of the source secondary node or PDU information on flows to be offloaded to other secondary node.

The master node may decide whether to accept a secondary node change request or not based on the secondary node change request message. If it is decided to accept the secondary node change request, the master node may decide the target secondary node.

In step S304, the master node transmits, to a target secondary node, a secondary node addition request message. Step S304 may correspond to step S104 in FIG. 8. The secondary node addition request message may include at least one of SCG configuration information, or PDU information on flows to be offloaded to the target secondary node.

In step S306, the master node receives, from the target secondary node, a secondary node addition request acknowledge message. Step S306 may correspond to step S106 in FIG. 8. The secondary node addition request acknowledge message may include at least one of a SCG configuration, a list of accepted and rejected PDU sessions or flows, or data forwarding addresses for the accepted PDU sessions or flows.

The master node may decide whether to accept a secondary node addition request or not based on the secondary node addition request acknowledge message.

In step S308, the master node transmits, to the source secondary node, a secondary node change request acknowledge message. The secondary node change request acknowledge message may include at least one of an indication on accept of a secondary node change request, an ID of the target secondary node, a SCG configuration of the target secondary node, a list of accepted and rejected PDU sessions or flows from the target secondary node, or data forwarding addresses for the accepted PDU sessions or flows.

1-2. Embodiment 1-2

Figure 12:
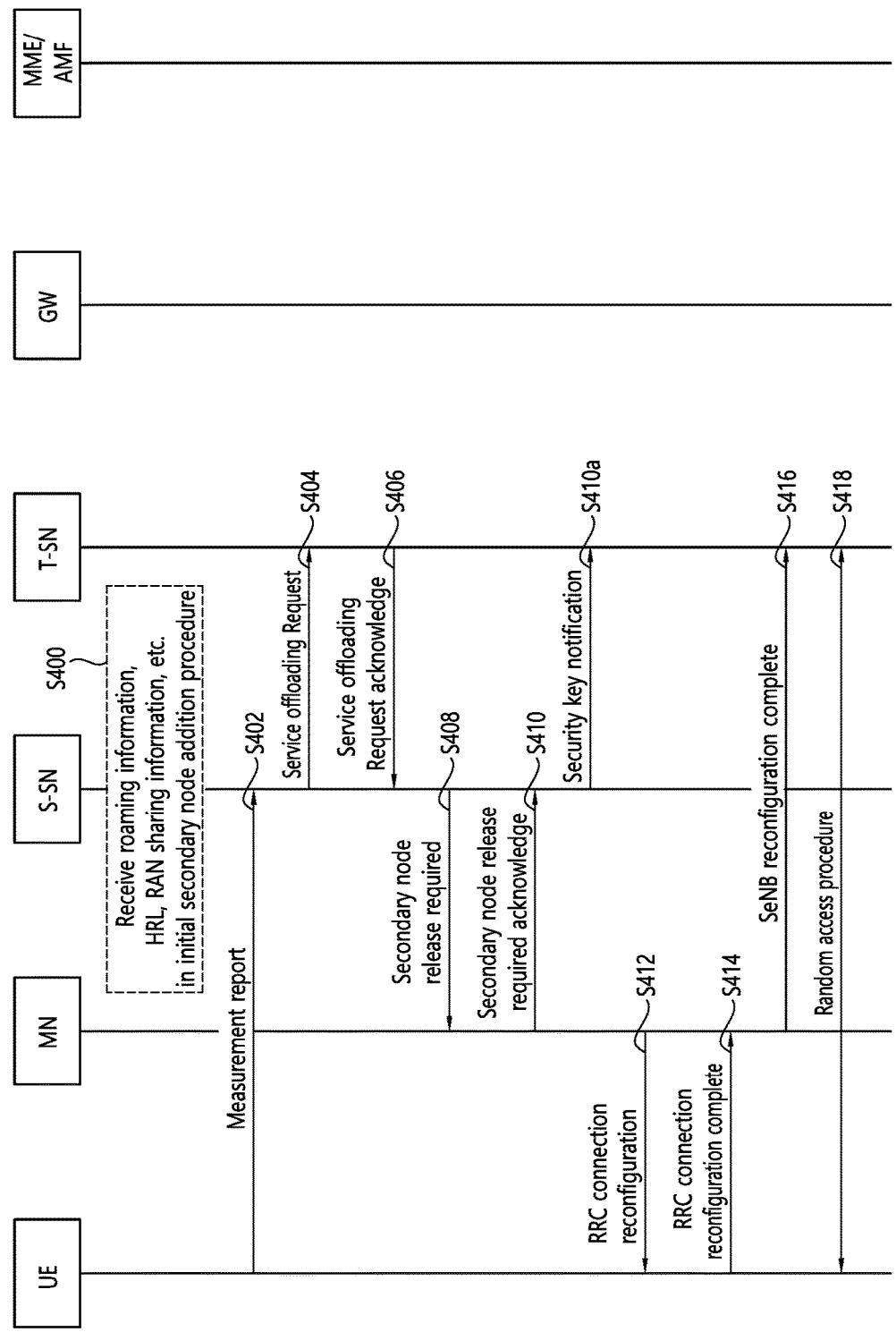
FIG. 12 shows a method for performing the secondary node change procedure initiated by the secondary node according to another embodiment of the present disclosure.

FIG. 12 shows a method for performing the secondary node change procedure initiated by the secondary node according to another embodiment of the present disclosure. In FIG. 12, MN represents the master node, S-SN the source secondary node, and T-SN the target secondary node.

In step S400, the source secondary node receives information about roaming, access restriction information (handover restriction list (HRL)), subscriber-related information and/or RAN sharing information (e.g., public land mobile network (PLMN) information) from the master node through the initial secondary node addition procedure. Also, the source secondary node may obtain, from the master node, security key information to be used by another secondary node. The another secondary node may be the node that may be changed potentially (or handed over) from the source secondary node.

In step S402, the source secondary node receives measurement reports about neighboring nodes from the UE. The source secondary node determines to offload the UE service to one of the neighboring nodes. The source secondary node may determine to offload the UE service to one of the neighboring nodes based on the measurement reports about the neighboring nodes. Also, the source secondary node may determine to offload the UE service to one of the neighboring nodes based on the information about roaming, access restriction information, subscriber-related information and/or RAN sharing information received in step S400.

In step S404, the source secondary node transmits a service offloading request message to a target secondary node. The service offloading request message is similar to the secondary node addition request message described in step S104 of FIG. 8. The service offloading request message may include at least one of the following information.

(1) SCG configuration information
(2) Indication of secondary node change
(3) Master node ID: It may be used by the target secondary node to determine whether to accept a service offloading request. More specifically, according to whether the source secondary node and the target secondary node are under the same master node, the master node ID may be used by the target secondary node to determine whether to accept the service offloading request.
(4) PDU information of a flow to be offloaded
(5) Information about roaming, access restriction information (HRL), subscriber-related information and/or RAN sharing information (e.g., PLMN information) for future mobility
(6) Security key information received in advance from the master node The target secondary node which has received the service offloading request message from the source secondary node determines whether to accept the service offloading request. The target secondary node may determine whether to accept the service offloading request based on the information received through the service offloading request message and/or radio resource situation of the target secondary node.

If the target secondary node accepts the service offloading request, the target secondary node transmits the service offloading request acknowledge message to the source secondary node in step S406. The service offloading request confirm message is similar to the secondary node addition request acknowledge message described in step S106 of FIG. 8. The service offloading request acknowledge message may include at least one of the following information.

(1) SCG configuration
(2) A list of accepted PDU sessions/flows and a list of rejected PDU sessions/flows,
(3) Data forwarding addresses for accepted PDU sessions/flows If the target secondary node rejects the service offloading request, the target secondary node may transmit the service offloading request reject message to the source secondary node. The service offloading request reject message is similar to the secondary node addition request reject message described with reference to FIG. 8. However, the service offloading request reject message is not shown in FIG. 12. The service offloading request reject message may include a cause of the rejection, e.g., absence of radio resources or not being under the same master node.

The source secondary node which has received the service offloading request acknowledge message from the target secondary node transmits a secondary node release required message to the master node in step S408. The secondary node release required message may include at least one of the following information (1) Indication informing that the purpose of the message is change of the secondary node
(2) ID of the target secondary node
(3) SCG configuration of the target secondary node
(4) Lists of PDU sessions/flows accepted and rejected by the target secondary node The master node which has received the secondary node release required message from the source secondary node determines whether to accept the secondary node release request. If the master node accepts the secondary node release request, the master node transmits a secondary node release required acknowledge message to the source secondary node in step S410. Also, the master node may allocate a new security key to be used by the target secondary node. The secondary node release required acknowledge message may include at least one of the following information (1) Indication of accepting change of the secondary node
(2) If the master node wants to retrieve a specific PDU/flow, information about type change of the corresponding PDU/flow (i.e., which bearer/flow goes back to the master node)
(3) New security key to be used by the target secondary node If the secondary node release required acknowledge message includes a new security key to be used by the target secondary node, the source secondary node which has received the secondary node release required acknowledge message from the master node transmits the new security key to the target secondary node in step S410a. The target secondary node may use the new security key for security of data transmission.

In step S412, the master node transmits an RRCConnectionReconfiguration message to the UE. The RRCConnectionReconfiguration message may include RRC configuration information of the master node and/or RRC configuration information of the target secondary node. The UE which has received the RRCConnectionReconfiguration message transmits an RRCConnectionReconfigurationComplete message to the master node in step S414. In case the UE is unable to comply with (part of) the configuration included in the RRCConnectionReconfiguration message, the UE performs a reconfiguration failure procedure.

If the RRC connection reconfiguration procedure is successful, the master node informs the target secondary node of the successful completion of the procedure in step S416.

In step S418, the UE performs synchronization with the target secondary node.

Afterwards, the operations described in steps S118 to S124 of FIG. 8 may be performed.

1-3. Embodiment 1-3

Figure 13:
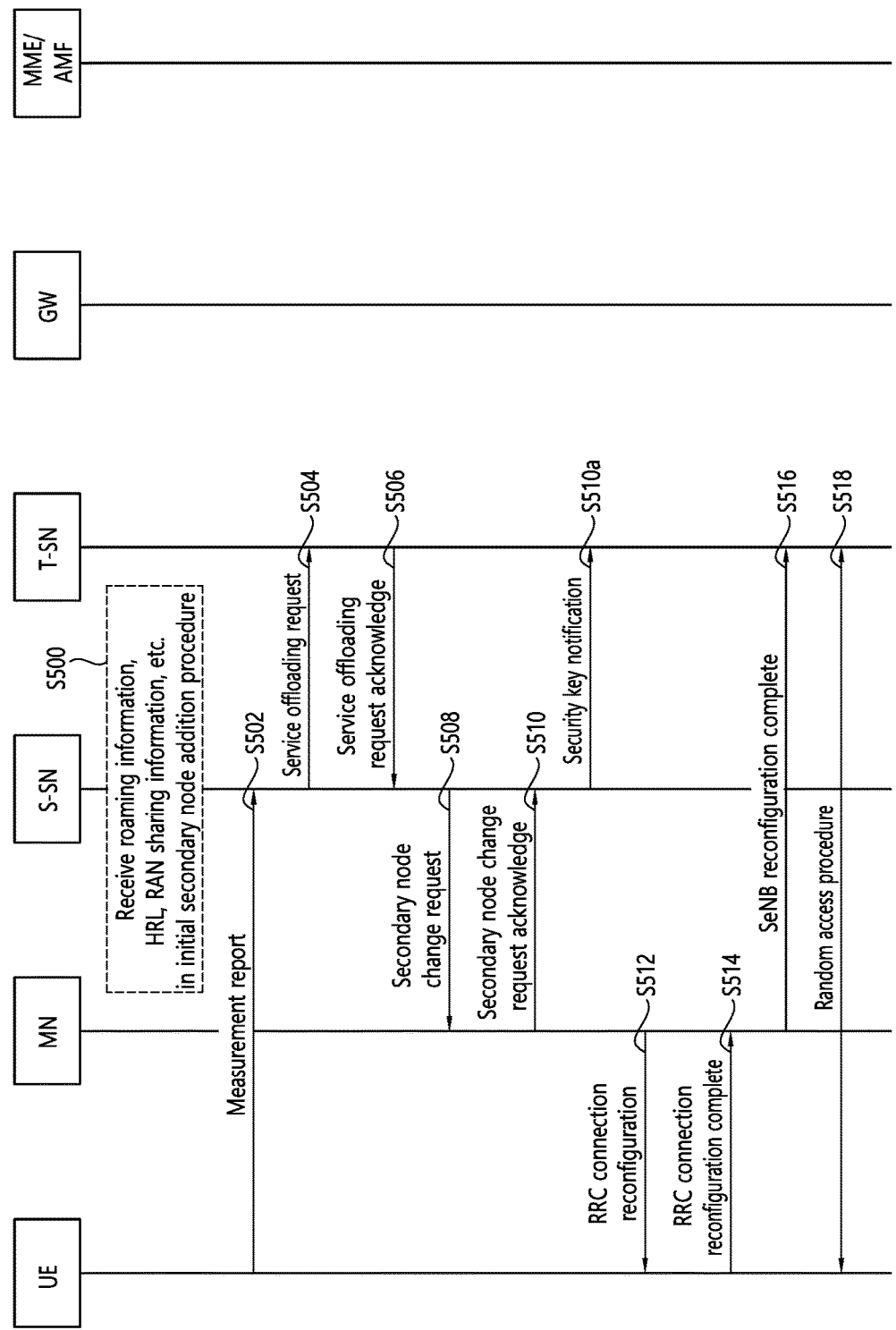
FIG. 13 shows a method for performing the secondary node change procedure initiated by the secondary node according to another embodiment of the present disclosure.

FIG. 13 shows a method for performing the secondary node change procedure initiated by the secondary node according to another embodiment of the present disclosure. In FIG. 13, MN represents the master node, S-SN the source secondary node, and T-SN the target secondary node.

In step S500, the source secondary node receives information about roaming, access restriction information (HRL), subscriber-related information and/or RAN sharing information (e.g., PLMN information) from the master node through the initial secondary node addition procedure. Also, the source secondary node may obtain, from the master node, security key information to be used by another secondary node. The another secondary node may be the node that may be changed potentially (or handed over) from the source secondary node.

In step S502, the source secondary node receives measurement reports about neighboring nodes from the UE. The source secondary node determines to offload the UE service to one of the neighboring nodes. The source secondary node may determine to offload the UE service to one of the neighboring nodes based on the measurement reports about the neighboring nodes. Also, the source secondary node may determine to offload the UE service to one of the neighboring nodes based on information about roaming, access restriction information, subscriber-related information and/or RAN sharing information received in step S500.

In step S504, the source secondary node transmits a service offloading request message to a target secondary node. The service offloading request message is similar to the secondary node addition request message described in step S104 of FIG. 8. The service offloading request message may include at least one of the following information.

(1) SCG configuration information
(2) Indication of secondary node change
(3) Master node ID: It may be used by the target secondary node to determine whether to accept a service offloading request. More specifically, according to whether the source secondary node and the target secondary node are under the same master node, the master node ID may be used by the target secondary node to determine whether to accept the service offloading request.
(4) PDU information of a flow to be offloaded
(5) Information about roaming, access restriction information (HRL), subscriber-related information and/or RAN sharing information (e.g., PLMN information) for future mobility
(6) Security key information received in advance from the master node The target secondary node which has received the service offloading request message from the source secondary node determines whether to accept the service offloading request. The target secondary node may determine whether to accept the service offloading request based on the information received through the service offloading request message and/or radio resource situation of the target secondary node.

If the target secondary node accepts the service offloading request, the target secondary node transmits the service offloading request acknowledge message to the source secondary node in step S506. The service offloading request acknowledge message is similar to the secondary node addition request acknowledge message described in step S106 of FIG. 8. The service offloading request acknowledge message may include at least one of the following information:

(1) SCG configuration
(2) A list of accepted PDU sessions/flows and a list of rejected PDU sessions/flows,
(3) Data forwarding addresses for accepted PDU sessions/flows.

If the target secondary node rejects the service offloading request, the target secondary node may transmit the service offloading request reject message to the source secondary node. The service offloading request reject message is similar to the secondary node addition request reject message described with reference to FIG. 8. However, the service offloading request reject message is not shown in FIG. 13. The service offloading request reject message may include a cause of the rejection, e.g., absence of radio resources or not being under the same master node.

The source secondary node which has received the service offloading request acknowledge message from the target secondary node transmits a secondary node change request message to the master node in step S508. The secondary node change request message may include at least one of the following information (1) Indication informing that the purpose of the message is change of the secondary node
(2) ID of the target secondary node
(3) SCG configuration of the target secondary node
(4) Lists of PDU sessions/flows accepted and rejected by the target secondary node The master node which has received the secondary node change request from the source secondary node determines whether to accept the secondary node change request. If the master node accepts the secondary node change request, the master node transmits a secondary node change request acknowledge message to the source secondary node in step S510. Also, the master node may allocate a new security key to be used by the target secondary node. The secondary node change request acknowledge message may include at least one of the following information.

(1) Indication of accepting change of the secondary node
(2) If the master node wants to retrieve a specific PDU/flow, information about type change of the corresponding PDU/flow (i.e., which bearer/flow goes back to the master node)
(3) New security key to be used by the target secondary node If the secondary node change request acknowledge message includes a new security key to be used by the target secondary node, the source secondary node which has received the secondary node change request acknowledge message from the master node transmits the new security key to the target secondary node in step S510a. The target secondary node may use the new security key for security of data transmission.

In step S512, the master node transmits an RRCConnectionReconfiguration message to the UE. The RRCConnectionReconfiguration message may include RRC configuration information of the master node and/or RRC configuration information of the target secondary node. The UE which has received the RRCConnectionReconfiguration message transmits an RRCConnectionReconfigurationComplete message to the master node in step S514. In case the UE is unable to comply with (part of) the configuration included in the RRCConnectionReconfiguration message, the UE performs a reconfiguration failure procedure.

If the RRC connection reconfiguration procedure is successful, the master node informs the target secondary node of the successful completion of the procedure in step S516.

In step S518, the UE performs synchronization with the target secondary node.

Afterwards, the operations described in steps S118 to S124 of FIG. 8 may be performed.

According to the embodiment of the present disclosure, the secondary node may offload its service directly to another secondary node. Therefore, the UE may receive a service in a more optimized condition. Also, utilization of radio resources of the master and secondary nodes may be improved.

Meanwhile, in the conventional SeNB addition procedure, the RRCConnectionReconfigurationComplete message has always been transmitted to the secondary node via the master node. This may be confirmed from FIG. 7 above. If the MeNB performs the SeNB addition procedure towards the T-SeNB as part of the SeNB change procedure, the RRCConnectionReconfigurationComplete message is transmitted to the T-SeNB via the MeNB. This operation may cause an unnecessary delay to the secondary node.

To solve the problem above, the present disclosure proposes a method used in the secondary node addition procedure, by which the UE directly transmits the RRCConnectionReconfigurationComplete message to the secondary node. In the embodiment below, the master and secondary nodes may be any one of network nodes of the LTE or NR. For example, the master node may be any one of eNB, gNB, en-gNB, and ng-eNB while the secondary node may also be any one of eNB, gNB, en-gNB, and ng-gNB.

2. Embodiment 2

Figure 14:
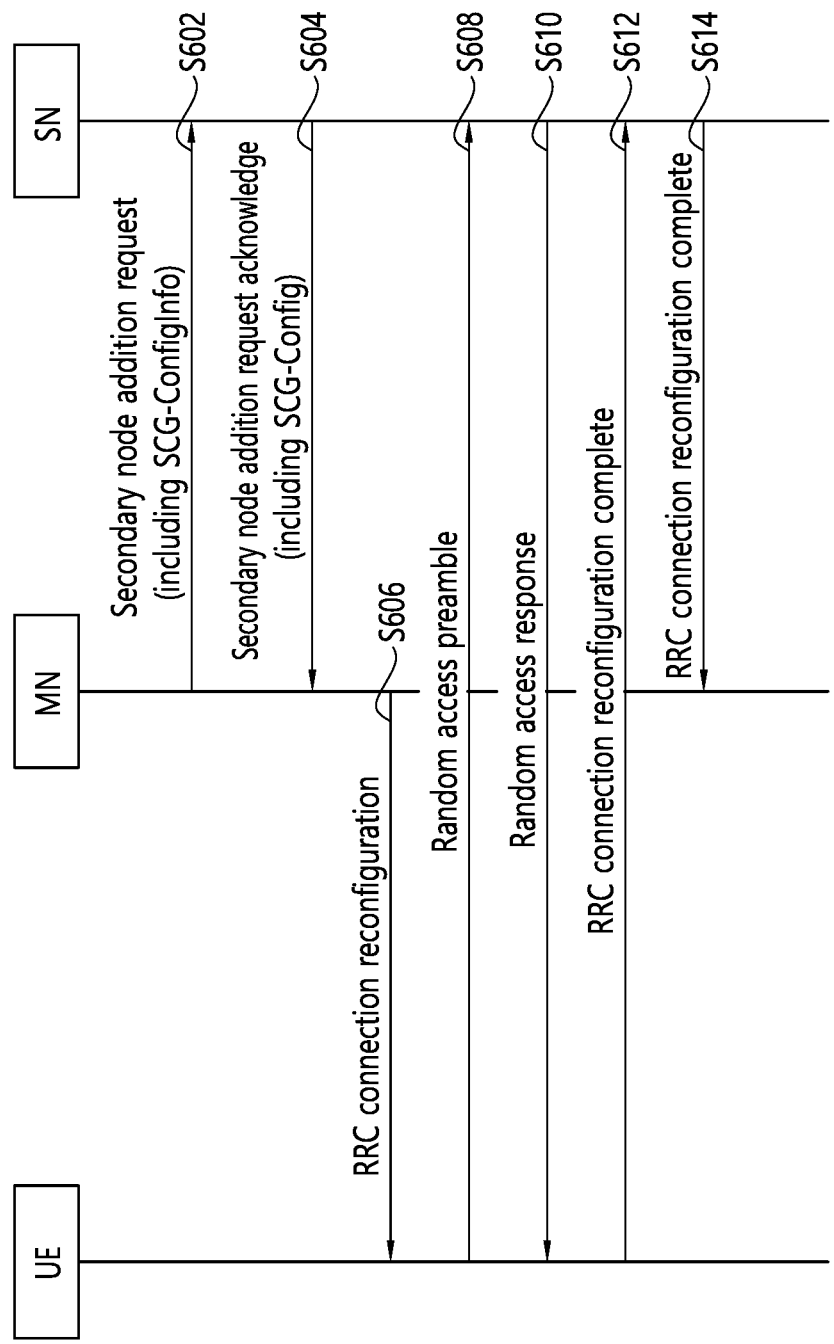
FIG. 14 shows a method for performing the secondary node addition procedure according to one embodiment of the present disclosure.

FIG. 14 shows a method for performing the secondary node addition procedure according to one embodiment of the present disclosure. The present embodiment may be applied to the initial addition of the secondary node.

If the master node determines to add a secondary node to provide a service to a specific UE, the master node transmits a secondary node addition request message to the secondary node in step S602. The secondary node addition request message may include SCG configuration information.

The secondary node which has received the secondary node addition request message from the master node determines the SCG configuration for the cell of the secondary node. In step S604, the secondary node transmits the secondary node addition request acknowledge message to the master node. The secondary node addition request acknowledge message includes the determined SCG configuration.

The master node which has received the secondary node addition request acknowledge message from the secondary node checks received parameters and the UE capability of the master node. In step S606, the master node transmits the RRCConnectionReconfiguration message to the UE. The RRCConnectionReconfiguration message includes the final parameters from the master and secondary nodes.

The UE which has received the RRCConnectionReconfiguration message from the master node initiates a random access procedure towards the secondary node. In step S608, the UE transmits a random access preamble to the secondary node, and in step S610, the UE receives a random access response from the secondary node.

In step S612, the UE directly transmits the RRCConnectionReconfigurationComplete message via the SCG signaling radio bearer (SRB). Therefore, a successful random access procedure towards the secondary node may come together with successful completion of RRC connection reconfiguration for the secondary node addition.

The secondary node which has received the RRCConnectionReconfigurationComplete message from the UE informs the master node of completion of the RRC connection reconfiguration for the secondary node in step S614. If the RRCConnectionReconfigurationComplete message includes information about the master node, the corresponding information may also be transmitted to the master node.

The master node which has received the RRCConnectionReconfigurationComplete message from the secondary node may start data packet transmission to the secondary node or initiate the data forwarding procedure.

According to the embodiment of the present disclosure, the secondary node may get the RRCConnectionReconfigurationComplete message and be prepared for resource allocation and data transmission quickly. Also, as the RRCConnectionReconfigurationComplete message is transmitted to the master node, the master node may start data packet transmission to the secondary node or initiate the data forwarding procedure.

Meanwhile, the present disclosure additionally proposes a method for more efficiently supporting the secondary node change procedure initiated by the secondary node. In the embodiment below, the master and secondary nodes may be any one of network nodes of the LTE or NR. For example, the master node may be any one of eNB, gNB, en-gNB, and ng-eNB while the secondary node may also be any one of eNB, gNB, en-gNB, and ng-gNB.

3-1. Embodiment 3-1

Figure 15:
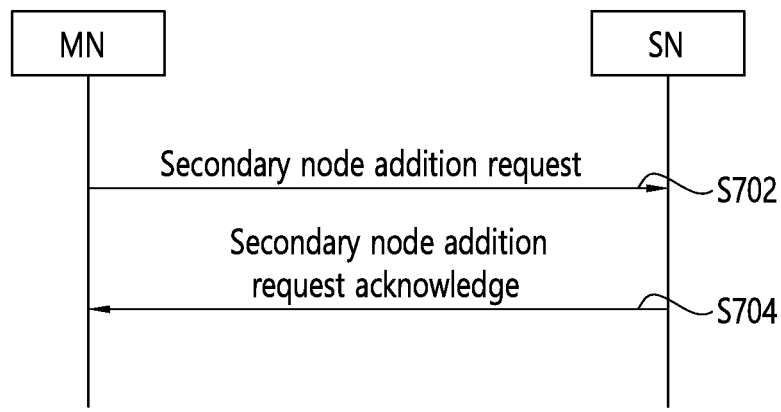
FIG. 15 shows a method for performing an improved secondary node addition procedure according to one embodiment of the present disclosure.

FIG. 15 shows a method for performing an improved secondary node addition procedure according to one embodiment of the present disclosure. The present embodiment proposes one alternative method that helps the secondary node determine secondary node change. In the opposite way, the present disclosure proposes one alternative method that helps the master node determine handover while maintaining the secondary node. Also, the present embodiment may be applied to another procedure.

First, it is assumed that a source secondary node receives measurement reports about neighboring nodes from the UE and determines to offload the UE service to one of the neighboring nodes.

In step S702, the master node transmits a secondary node addition request message to the secondary node. The secondary node addition request message may include at least one of the following information.

(1) A list of neighboring secondary nodes connected to the secondary node through the X2/Xn interface: The list of neighboring secondary nodes may comprise eNB/gNB IDs and/or cell IDs. The list of neighboring secondary nodes may be used later to help the secondary node trigger the secondary node change procedure. In other words, the secondary node may determine secondary node change in the future based on the list of neighboring secondary nodes. The list of neighboring secondary nodes is obtained first by the master node through the X2/Xn setup procedure between the master node and secondary nodes in the surroundings thereof.

(2) Information about roaming for the UE and/or access restriction information: This information may also be used later to help the secondary node trigger the secondary node change procedure.

(3) A list of neighboring master nodes connected to the master node through the X2/Xn interface.

The secondary node which has received a secondary node addition request message from the master node may store information included in the secondary node addition request message and take into account the stored information in a future mobility procedure. For example, the secondary node may take into account the information included in the secondary node addition request message in the secondary node change procedure or handover procedure to other master node. The corresponding information is important for the secondary node to determine a potential target secondary node.

In step S704, the secondary node transmits a secondary node addition request acknowledge message to the master node. The secondary node addition request acknowledge message may include at least one of the following information.

(1) A list of neighboring master nodes connected to the secondary node through the X2/Xn interface: The list of neighboring master nodes may comprise eNB/gNB IDs and/or cell IDs.

(2) A list of neighboring secondary nodes connected to the secondary node through the X2/Xn interface.

The master node which has received the secondary node addition request acknowledge message from the secondary node may use the information included in the secondary node addition request acknowledge message when handover to other master node is determined while the secondary node is maintained.

3-2. Embodiment 3-2

Figure 16:
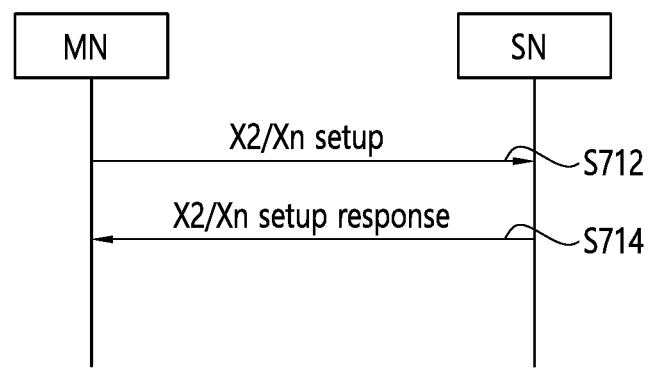
FIG. 16 shows a method for performing an improved X2/Xn setup procedure between a master node and a secondary node according to one embodiment of the present disclosure.

FIG. 16 shows a method for performing an improved X2/Xn setup procedure between a master node and a secondary node according to one embodiment of the present disclosure. The present embodiment proposes one alternative method that helps the secondary node determine secondary node change. In the opposite way, the present disclosure proposes one alternative method that helps the master node determine handover while maintaining the secondary node. Also, the present embodiment may be applied to another procedure.

In step S712, the master node transmits an X2/Xn setup request message to the secondary node. The X2/Xn setup request message may include at least one of the following information.

(1) A list of neighboring secondary nodes connected to the secondary node through the X2/Xn interface: The list of neighboring secondary nodes may comprise eNB/gNB IDs and/or cell IDs. The list of neighboring secondary nodes may be used later to help the secondary node trigger the secondary node change procedure. In other words, the secondary node may determine secondary node change in the future based on the list of neighboring secondary nodes. The list of neighboring secondary nodes is obtained first by the master node through the X2/Xn configuration procedure between the master node and secondary nodes in the surroundings thereof.

(2) A list of neighboring master nodes connected to the master node through the X2/Xn interface.

The secondary node which has received an X2/Xn setup request message from the master node may store information included in the X2/Xn setup request message and take into account the stored information in a future mobility procedure. For example, the secondary node may take into account the information included in the X2/Xn setup request message in the secondary node change procedure or handover procedure to other master node. The corresponding information is important for the secondary node to determine a potential target secondary node.

In step S714, the secondary node transmits an X2/Xn setup response message to the master node. The X2/Xn setup response message may include at least one of the following information:

(1) A list of neighboring master nodes connected to the secondary node through the X2/Xn interface: The list of neighboring master nodes may comprise eNB/gNB IDs and/or cell IDs.

(2) A list of neighboring secondary nodes connected to the secondary node through the X2/Xn interface.

The master node which has received the X2/Xn setup response message from the secondary node may use the information included in the X2/Xn setup response message when handover to other master node is determined while the secondary node is maintained.

3-3. Embodiment 3-3

Figure 17:
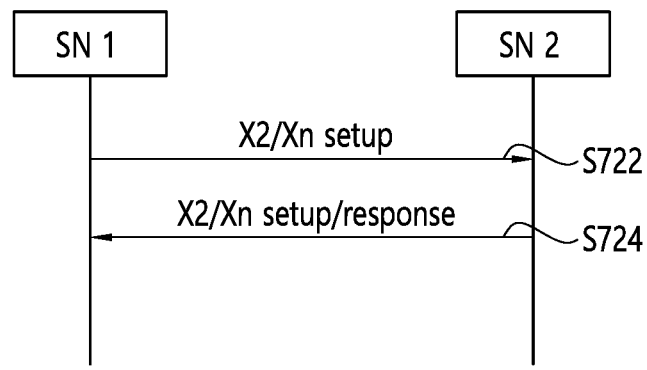
FIG. 17 shows a method for performing an improved X2/Xn setup procedure between secondary nodes according to one embodiment of the present disclosure.

FIG. 17 shows a method for performing an improved X2/Xn setup procedure between secondary nodes according to one embodiment of the present disclosure. The present embodiment proposes one alternative method that helps the secondary node determine secondary node change. Also, the present embodiment may be applied to another procedure.

In step S722, the first secondary node transmits an X2/Xn setup request message to the second secondary node. The X2/Xn setup request message may include a list of neighboring master nodes connected to the first secondary node through the X2/Xn interface. The list of neighboring master nodes may comprise eNB/gNB IDs and/or cell IDs. The list of neighboring master nodes may be used later to help the second secondary node trigger the secondary node change procedure. In other words, the second secondary node may determine secondary node change in the future based on the list of neighboring master nodes. The list of neighboring master nodes is obtained first by the first secondary node through the X2/Xn setup procedure between the first secondary node and master nodes in the surroundings thereof.

The second secondary node which has received an X2/Xn setup request message from the first secondary node may store information included in the X2/Xn setup request message and take into account the stored information in a future mobility procedure. For example, the second secondary node may take into account the information included in the X2/Xn setup request message in the secondary node change procedure. The corresponding information is important for the second secondary node to determine a potential target secondary node.

In step S724, the second secondary node transmits an X2/Xn setup response message to the first secondary node. The X2/Xn setup response message may include a list of neighboring master nodes connected to the second secondary node through the X2/Xn interface. The list of neighboring master nodes may comprise eNB/gNB IDs and/or cell IDs. The list of neighboring master nodes may be used later to help the first secondary node trigger the secondary node change procedure. In other words, the first secondary node may determine secondary node change in the future based on the list of neighboring master nodes. The list of neighboring master nodes is obtained first by the second secondary node through the X2/Xn setup procedure between the second secondary node and master nodes in the surroundings thereof.

The first secondary node which has received an X2/Xn setup response message from the second secondary node may use the information included in the X2/Xn setup response message in a future mobility procedure such as secondary node change. The corresponding information is important for the first secondary node to determine a potential target secondary node.

Meanwhile, as a list of neighboring master nodes to which the first and second secondary nodes are connected is exchanged, the first and second secondary nodes may know whether the same master node is shared between them. If the first and second secondary nodes share the same master node, one secondary node may determine whether to initiate the secondary node change procedure directly to other secondary nodes sharing the same master node.

According to the embodiment of the present disclosure, the secondary node may offload its service directly to another secondary node. Or the master node may determine whether to maintain the secondary node. Therefore, compared with the conventional technology, the amount of signaling may be reduced. Also, the UE may receive a service in a more optimized condition. Also, utilization of radio resources of the master and secondary nodes may be improved.

Figure 18:
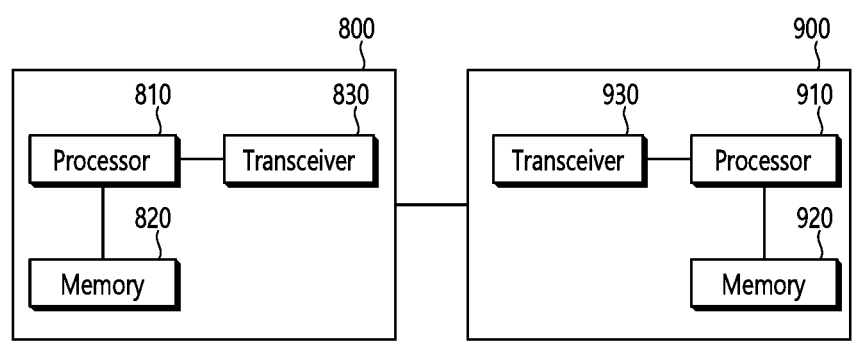
FIG. 18 shows a wireless communication system in which the embodiment of the present disclosure is implemented.

FIG. 18 shows a wireless communication system in which the embodiment of the present disclosure is implemented.

The first node 800 includes a processor 810, a memory 820, and a transceiver 830. The first node 800 may be any one of the master node, source secondary node, and target secondary node described above. In other words, the first node may be any one of eNB, gNB, ng-eNB, and en-gNB. The processor 810 may be configured to implement functions, processes and/or methods described in the present disclosure. Layers of a radio interface protocol may be implemented by the processor 810. The memory 820, being connected to the processor 810, stores various pieces of information to operate the processor 810. The transceiver 830, being connected to the processor 810, transmits and/or receives a signal.

The second node 900 includes a processor 910, a memory 920, and a transceiver 930. The second node 900 may be any one of the master node, source secondary node, and target secondary node described above. In other words, the second node may be any one of eNB, gNB, ng-eNB, and en-gNB. The processor 910 may be configured to implement functions, processes and/or methods described in the present disclosure. Layers of a radio interface protocol may be implemented by the processor 910. The memory 920, being connected to the processor 910, stores various pieces of information to operate the processor 910. The transceiver 930, being connected to the processor 910, transmits and/or receives a signal.

The first node 800 and second node 900 are connected to each other through the X2 interface or Xn interface.

The processor 810, 910 may include application-specific integrated circuit (ASIC), other chipset, logical circuit and/or data processing device. The memory 820, 920 may include read-only memory (ROM), random access memory (RAM), flash memory, memory card, storage medium and/or other storage device. The transceiver 830, 930 may include a baseband circuit for processing a radio frequency signal. When an embodiment is implemented by software, the aforementioned method may be implemented by a module (process or function) which performs the aforementioned function. The module may be stored in the memory 820,920 and executed by the processor 810, 910. The memory 820, 920 may be installed inside or outside the processor 810, 910 and may be connected to the processor 810, 910 via various well-known means.

Figure 19:
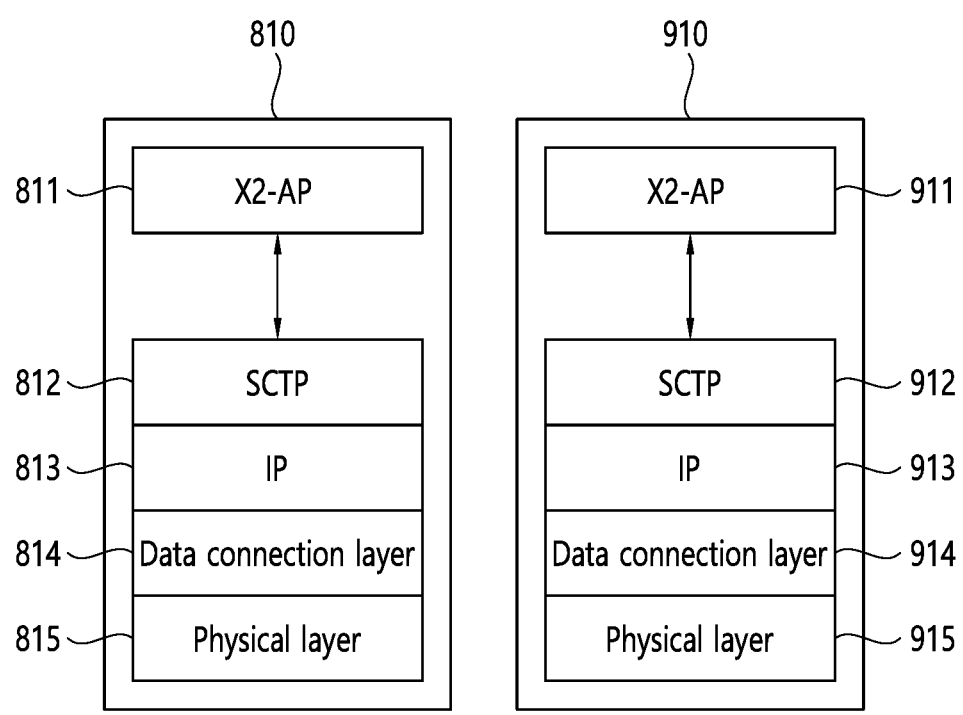
FIG. 19 shows a wireless communication system in which an embodiment of the present disclosure is implemented.

FIG. 19 shows a wireless communication system in which an embodiment of the present disclosure is implemented.

The processor 810 includes X2 application protocol (X2-AP) layer 811, a stream control transmission protocol (SCTP) layer 812, an Internet protocol (IP) layer 813, a data connection layer 814, and a physical layer 815. The X2-AP layer 811 is included in the radio network layer (RNL). The RNL defines a procedure related to the interaction between eNBs. The X2-AP layer 811 defines the protocol responsible for providing signaling information through the X2 interface. The X2-AP layer 811 is terminated by two eNBs connected to each other through the X2 interface. The X2-AP layer 811 may be implemented by the X2-AP procedure module. The X2-AP layer 811 may be configured to implement functions, processes and/or methods described in the present disclosure. The SCTP layer 812, IP layer 813, data connection layer 814, and physical layer 815 may be included in the transport network layer (TNL). TNL provides the user plane and service for signaling delivery.

The processor 910 includes X2-AP layer 911, SCTP layer 912, IP layer 913, data connection layer 914, and physical layer 915. The X2-AP layer 911 is included in the RNL. The RNL defines a procedure related to the interaction between eNBs. The X2-AP layer 911 defines the protocol responsible for providing signaling information through the X2 interface. The X2-AP layer 911 is terminated by two eNBs connected to each other through the X2 interface. The X2-AP layer 911 may be implemented by the X2-AP procedure module. The X2-AP layer 911 may be configured to implement functions, processes and/or methods described in the present disclosure. The SCTP layer 912, IP layer 913, data connection layer 914, and physical layer 915 may be included in the TNL. TNL provides the user plane and service for signaling delivery.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for performing, by a master node, a secondary node change procedure from a source secondary node to a target secondary node in a wireless communication system, wherein the secondary node change procedure is initiated by the source secondary node, the method comprising:

receiving, by a master node from the source secondary node, a secondary node change request message which includes 1) an identifier (ID) of the target secondary node, 2) information on protocol data unit (PDU) sessions to be offloaded to the target secondary node, and 3) secondary cell group (SCG) configuration information;

transmitting, by the master node to the target secondary node, a secondary node addition request message which includes 1) the information on the PDU sessions to be offloaded to the target secondary node, and 2) the SCG configuration information;

receiving, by the master node from the target secondary node, a secondary node addition request acknowledge message which includes 1) a list of accepted PDU sessions and rejected PDU sessions among the PDU sessions, 2) a SCG configuration of the target secondary node, and 3) data forwarding addresses for the accepted PDU sessions;

transmitting, by the master node to a user equipment, a radio resource control (RRC) connection reconfiguration message including the SCG configuration of the target secondary node; and transmitting, by the master node to the source secondary node, a secondary node change request acknowledge message which includes the list of the accepted PDU sessions.

2. The method of claim 1, wherein the secondary node change request message further includes at least one of an indication of a secondary node change request, or a measurement report on cells of the target secondary node.

3. The method of claim 1, further comprising deciding, by the master node, whether to accept a secondary node change request or not based on the secondary node change request message.

4. The method of claim 1, further comprising deciding, by the master node, whether to accept a secondary node addition request or not based on the secondary node addition request acknowledge message.

5. The method of claim 1, wherein the secondary node change request acknowledge message further includes at least one of an indication of acceptance of a secondary node change request, an ID of the target secondary node, the SCG configuration of the target secondary node, the list of the rejected PDU sessions, or data forwarding addresses for the accepted PDU sessions.

6. The method of claim 1, wherein the master node is one of an eNodeB (eNB), a gNB, an en-gNB or ng-eNB.

7. The method of claim 1, wherein the source secondary node and the target secondary node is one of an eNB, a gNB, an en-gNB or ng-eNB.

8. A master node configured to perform a secondary node change procedure from a source secondary node to a target secondary node in a wireless communication system, wherein the secondary node change procedure is initiated by the source secondary node, the master node comprising:

a memory;

a transceiver; and a processor, operably coupled to the memory and the transceiver, wherein the master node is configured to perform operations comprising:

receiving, from the source secondary node, a secondary node change request message which includes 1) an identifier (ID) of the target secondary node, 2) information on protocol data unit (PDU) sessions to be offloaded to the target secondary node, and 3) secondary cell group (SCG) configuration information;

transmitting, to the target secondary node, a secondary node addition request message which includes 1) the information on the PDU sessions to be offloaded to the target secondary node, and 2) the SCG configuration information;

receiving, from the target secondary node, a secondary node addition request acknowledge message which includes 1) a list of accepted PDU sessions and rejected PDU sessions among the PDU sessions, 2) a SCG configuration of the target secondary node, and 3) data forwarding addresses for the accepted PDU sessions;

transmitting, by the master node to a user equipment, a radio resource control (RRC) connection reconfiguration message including the SCG configuration of the target secondary node; and transmitting, to the source secondary node, a secondary node change request acknowledge message which includes the list of the accepted PDU sessions.

* * * * *